(12) United States Patent
Cheng et al.

(10) Patent No.: US 11,924,308 B2
(45) Date of Patent: *Mar. 5, 2024

(54) DYNAMIC SCHEDULING SYSTEM FOR PLANNED SERVICE REQUESTS

(71) Applicant: Uber Technologies, Inc., San Francisco, CA (US)

(72) Inventors: Gang Cheng, San Francisco, CA (US); Jason Chionh, San Francisco, CA (US); Jonathan Kantrowitz, San Francisco, CA (US); Oren Freiberg, San Francisco, CA (US); Juncao Li, Bellevue, WA (US); Jie Zhang, Redmond, WA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,115

(22) Filed: Jan. 6, 2023

(65) Prior Publication Data

US 2023/0147033 A1 May 11, 2023

Related U.S. Application Data

(63) Continuation of application No. 17/366,924, filed on Jul. 2, 2021, now Pat. No. 11,582,328, which is a (Continued)

(51) Int. Cl.
*G06F 15/173* (2006.01)
*H04L 67/50* (2022.01)
(Continued)

(52) U.S. Cl.
CPC ............. *H04L 67/62* (2022.05); *H04L 67/52* (2022.05); *H04L 67/535* (2022.05)

(58) Field of Classification Search
CPC ........ H04L 67/62; H04L 67/52; H04L 67/535
(Continued)

(56) References Cited

U.S. PATENT DOCUMENTS

| | | | |
|---|---|---|---|
| 5,557,522 | A | 9/1996 | Nakayama |
| 5,948,040 | A | 9/1999 | DeLorme |

(Continued)

FOREIGN PATENT DOCUMENTS

| | | |
|---|---|---|
| CA | 2604321 | 10/2006 |
| CA | 2975002 | 8/2016 |

(Continued)

OTHER PUBLICATIONS

*Exam Report No. 2 in AU 2017328067 dated Jan. 20, 2022.
(Continued)

*Primary Examiner* — Alan S Chou
(74) *Attorney, Agent, or Firm* — Mahamedi IP Law LLP

(57) ABSTRACT

A computer system can receive user data from a computing device of a user, and based on the user data, determine that the user will utilize a transport service to arrive at a destination location at a specified time. The system can monitor transport provider availability within a proximity of a current location of the user prior to the specified time. The system can then determine a service request time for the user based at least in part on the transport provider availability, and automatically generate the service request for the user at the service request time to match the user to a transport provider.

20 Claims, 6 Drawing Sheets

Related U.S. Application Data continuation of application No. 16/905,347, filed on Jun. 18, 2020, now Pat. No. 11,196,838, which is a continuation of application No. 15/675,683, filed on Aug. 11, 2017, now Pat. No. 10,721,327.

(51) Int. Cl.
 *H04L 67/52* (2022.01)
 *H04L 67/62* (2022.01)

(58) Field of Classification Search
 USPC ........................................................ 709/224
 See application file for complete search history.

(56) References Cited

U.S. PATENT DOCUMENTS

| | | | |
|---|---|---|---|
| 6,058,339 A | 5/2000 | Takiguchi | |
| 6,233,517 B1 | 5/2001 | Froeberg | |
| 6,321,158 B1 | 11/2001 | DeLorme | |
| 6,608,566 B1 | 8/2003 | Davis | |
| 6,756,913 B1 | 6/2004 | Ayed | |
| 6,832,092 B1 | 12/2004 | Suarez | |
| 7,024,205 B1 | 4/2006 | Hose | |
| 7,062,376 B2 | 6/2006 | Oesterling | |
| 7,263,437 B2 | 8/2007 | Hirose | |
| 7,519,916 B1 | 4/2009 | Hartwell | |
| 7,957,871 B1 | 6/2011 | Echeruo | |
| 7,970,749 B2 | 6/2011 | Uhlir | |
| 8,412,667 B2 | 4/2013 | Zhang | |
| 8,630,987 B2 | 1/2014 | Dhuse | |
| 9,070,101 B2 | 6/2015 | Abhyanker | |
| 9,075,136 B1 | 7/2015 | Joao | |
| 9,172,738 B1 | 10/2015 | daCosta | |
| 9,197,696 B1 | 11/2015 | Jakatdar | |
| 9,244,147 B1 | 1/2016 | Soundararajan | |
| 9,610,893 B2 | 4/2017 | Lopez-Hinojosa | |
| 9,886,667 B2 | 2/2018 | Lord | |
| 9,911,170 B2 | 3/2018 | Kim | |
| 9,922,469 B1 | 3/2018 | Ashton | |
| 9,990,655 B2 | 6/2018 | MacTiernan | |
| 9,997,863 B2 | 6/2018 | Matsuura et al. | |
| 10,002,333 B2 | 6/2018 | Lord | |
| 10,074,065 B2 | 9/2018 | Jones | |
| 10,152,053 B1 | 12/2018 | Smith | |
| 10,178,890 B1 | 1/2019 | Andon | |
| 10,328,855 B2 | 6/2019 | Lopez-Hinojosa | |
| 10,458,801 B2 | 10/2019 | Lord | |
| 10,572,964 B2 | 2/2020 | Kim | |
| 10,721,327 B2 | 7/2020 | Cheng | |
| 11,196,838 B2 | 12/2021 | Cheng | |
| 11,582,328 B2 * | 2/2023 | Cheng .................. H04L 67/535 |
| 2001/0037174 A1 | 11/2001 | Dickerson | |
| 2002/0034292 A1 | 3/2002 | Tuoriniemi | |
| 2003/0040944 A1 | 2/2003 | Hileman | |
| 2003/0058082 A1 | 3/2003 | Mallick | |
| 2004/0158483 A1 | 8/2004 | Lecouturier | |
| 2004/0198366 A1 | 10/2004 | Crocker | |
| 2004/0202132 A1 | 10/2004 | Heinonen | |
| 2004/0225520 A1 | 11/2004 | Aoki | |
| 2004/0249818 A1 | 12/2004 | Isaac | |
| 2005/0004757 A1 | 1/2005 | Neeman | |
| 2005/0021227 A1 | 1/2005 | Matsumoto | |
| 2005/0177799 A1 | 8/2005 | Knight | |
| 2005/0227704 A1 | 10/2005 | Ferra | |
| 2005/0278063 A1 | 12/2005 | Hersh | |
| 2005/0278192 A1 | 12/2005 | Cantini | |
| 2006/0023569 A1 | 2/2006 | Agullo | |
| 2006/0034201 A1 | 2/2006 | Umeda | |
| 2006/0059023 A1 | 3/2006 | Mashinsky | |
| 2006/0155460 A1 | 7/2006 | Raney | |
| 2006/0173841 A1 | 8/2006 | Bill | |
| 2006/0184341 A1 | 8/2006 | Couckuyt | |
| 2006/0293937 A1 | 12/2006 | Sohm | |
| 2007/0011233 A1 | 1/2007 | Manion | |
| 2007/0011324 A1 | 1/2007 | Mehr | |
| 2007/0150375 A1 | 6/2007 | Yang | |
| 2008/0033633 A1 | 2/2008 | Akiyoshi | |
| 2008/0177584 A1 | 7/2008 | Altaf et al. | |
| 2008/0195428 A1 | 8/2008 | O'Sullivan | |
| 2008/0208441 A1 | 8/2008 | Cheung | |
| 2008/0270019 A1 | 10/2008 | Anderson | |
| 2008/0277183 A1 | 11/2008 | Huang | |
| 2009/0030885 A1 | 1/2009 | DePasquale | |
| 2009/0113296 A1 | 4/2009 | Lacy | |
| 2009/0156241 A1 | 6/2009 | Staffaroni | |
| 2009/0176508 A1 | 7/2009 | Lubeck | |
| 2009/0192851 A1 | 7/2009 | Bishop | |
| 2009/0216600 A1 | 8/2009 | Hill | |
| 2009/0235176 A1 | 9/2009 | Jayanthi | |
| 2009/0248587 A1 | 10/2009 | Van Buskirk | |
| 2009/0296990 A1 | 12/2009 | Holland | |
| 2010/0070168 A1 | 3/2010 | Sumcad | |
| 2010/0074383 A1 | 3/2010 | Lee | |
| 2010/0153279 A1 | 6/2010 | Zahn | |
| 2010/0179750 A1 | 7/2010 | Gum | |
| 2010/0207812 A1 | 8/2010 | Demirdjian | |
| 2010/0211498 A1 | 8/2010 | Aabye et al. | |
| 2010/0280853 A1 | 11/2010 | Petralia | |
| 2011/0099040 A1 | 4/2011 | Felt | |
| 2011/0145089 A1 | 6/2011 | Khunger | |
| 2011/0153629 A1 | 6/2011 | Lehmann et al. | |
| 2011/0225257 A1 | 9/2011 | Tilden et al. | |
| 2011/0238289 A1 | 9/2011 | Lehmann | |
| 2011/0238755 A1 | 9/2011 | Khan | |
| 2011/0251951 A1 | 10/2011 | Kolkowitz et al. | |
| 2011/0301997 A1 | 12/2011 | Gale et al. | |
| 2012/0004840 A1 | 1/2012 | Lee | |
| 2012/0023294 A1 | 1/2012 | Resnick | |
| 2012/0041675 A1 | 2/2012 | Juliver | |
| 2012/0072249 A1 | 3/2012 | Weir et al. | |
| 2012/0203599 A1 | 8/2012 | Choi | |
| 2012/0232943 A1 | 9/2012 | Myr | |
| 2012/0239289 A1 | 9/2012 | Gontmakher | |
| 2012/0253548 A1 | 10/2012 | Davidson | |
| 2012/0253654 A1 | 10/2012 | Sun | |
| 2012/0265580 A1 | 10/2012 | Kobayashi | |
| 2012/0290950 A1 | 11/2012 | Rapaport | |
| 2012/0311584 A1 | 12/2012 | Gruber | |
| 2013/0018795 A1 | 1/2013 | Kolhatkar et al. | |
| 2013/0024249 A1 | 1/2013 | Zohar | |
| 2013/0036117 A1 | 2/2013 | Fisher | |
| 2013/0046456 A1 | 2/2013 | Scofield | |
| 2013/0054281 A1 | 2/2013 | Thakkar | |
| 2013/0073327 A1 | 3/2013 | Edelberg | |
| 2013/0090950 A1 | 4/2013 | Rao | |
| 2013/0110392 A1 | 5/2013 | Kosseifi | |
| 2013/0132140 A1 | 5/2013 | Amin | |
| 2013/0138723 A1 | 5/2013 | Ku | |
| 2013/0144831 A1 | 6/2013 | Atlas | |
| 2013/0215843 A1 | 8/2013 | Diachina | |
| 2013/0246301 A1 | 9/2013 | Radhakrishnan | |
| 2013/0311997 A1 | 11/2013 | Gruber | |
| 2014/0025410 A1 | 1/2014 | Churchman et al. | |
| 2014/0074536 A1 | 3/2014 | Meushar | |
| 2014/0082069 A1 | 3/2014 | Varoglu | |
| 2014/0129302 A1 | 5/2014 | Amin et al. | |
| 2014/0129951 A1 | 5/2014 | Amin | |
| 2014/0149157 A1 | 5/2014 | Shaam et al. | |
| 2014/0149441 A1 | 5/2014 | Wang | |
| 2014/0164525 A1 | 6/2014 | Malik | |
| 2014/0172727 A1 | 6/2014 | Abhyanker | |
| 2014/0195972 A1 | 7/2014 | Lee | |
| 2014/0221006 A1 | 8/2014 | Jhanji | |
| 2014/0364150 A1 | 12/2014 | Marti | |
| 2014/0378118 A1 | 12/2014 | Mohebbi | |
| 2014/0378159 A1 | 12/2014 | Dolbakian | |
| 2015/0006072 A1 | 1/2015 | Goldberg | |
| 2015/0012341 A1 | 1/2015 | Amin | |
| 2015/0032485 A1 | 1/2015 | Nelson | |
| 2015/0039368 A1 | 2/2015 | Polyakov | |
| 2015/0045068 A1 | 2/2015 | Soffer | |
| 2015/0055178 A1 | 2/2015 | Ishibashi | |
| 2015/0073645 A1 | 3/2015 | Davidsson | |
| 2015/0099461 A1 | 4/2015 | Holden | |

(56) References Cited

U.S. PATENT DOCUMENTS

| | | |
|---|---|---|
| 2015/0161554 A1 | 6/2015 | Sweeney |
| 2015/0161698 A1 | 6/2015 | Jones |
| 2015/0176997 A1 | 6/2015 | Pursche |
| 2015/0204684 A1 | 7/2015 | Rostamian |
| 2015/0248689 A1 | 9/2015 | Paul |
| 2015/0254581 A1 | 9/2015 | Brahme |
| 2015/0262430 A1 | 9/2015 | Farrelly |
| 2015/0323330 A1 | 11/2015 | Lord |
| 2015/0324718 A1 | 11/2015 | Lord |
| 2015/0325128 A1 | 11/2015 | Lord |
| 2015/0339923 A1 | 11/2015 | Konig |
| 2015/0339928 A1 | 11/2015 | Ramanujam |
| 2016/0006702 A1 | 1/2016 | Chestnut |
| 2016/0019496 A1 | 1/2016 | Gorlin |
| 2016/0026936 A1 | 1/2016 | Richardson |
| 2016/0027306 A1 | 1/2016 | Lambert |
| 2016/0048804 A1 | 2/2016 | Paul |
| 2016/0069694 A1 | 3/2016 | Tao |
| 2016/0105787 A1 | 4/2016 | Hammer |
| 2016/0132792 A1 | 5/2016 | Rosnow |
| 2016/0140789 A1 | 5/2016 | Wickersham, III |
| 2016/0165510 A1 | 6/2016 | Jun |
| 2016/0171584 A1 | 6/2016 | Cao |
| 2016/0203522 A1 | 7/2016 | Shiffert |
| 2016/0300318 A1 | 10/2016 | Godil |
| 2016/0320195 A1 | 11/2016 | Liu |
| 2016/0364678 A1 | 12/2016 | Cao |
| 2016/0364679 A1 | 12/2016 | Cao |
| 2016/0364812 A1 | 12/2016 | Cao |
| 2016/0364823 A1 | 12/2016 | Cao |
| 2016/0370194 A1 | 12/2016 | Colijn |
| 2017/0013408 A1 | 1/2017 | Grzywaczewski |
| 2017/0052034 A1 | 2/2017 | Magazinik |
| 2017/0059347 A1 | 3/2017 | Flier |
| 2017/0083832 A1 | 3/2017 | Williams |
| 2017/0115125 A1 | 4/2017 | Outwater |
| 2017/0126837 A1 | 5/2017 | Wang |
| 2017/0132540 A1 | 5/2017 | Haparnas |
| 2017/0147951 A1 | 5/2017 | Meyer |
| 2017/0147959 A1 | 5/2017 | Sweeney |
| 2017/0169366 A1 | 6/2017 | Klein |
| 2017/0169535 A1 | 6/2017 | Tolkin |
| 2017/0186126 A1 | 6/2017 | Marco |
| 2017/0191842 A1 | 7/2017 | Magazinik |
| 2017/0193404 A1 | 7/2017 | Yoo |
| 2017/0193458 A1 | 7/2017 | Marco |
| 2017/0220966 A1 | 8/2017 | Wang |
| 2017/0240098 A1 | 8/2017 | Sweeney |
| 2017/0255881 A1 | 9/2017 | Ritch |
| 2017/0263120 A1 | 9/2017 | Durie, Jr. |
| 2017/0270794 A1 | 9/2017 | Sweeney |
| 2017/0272901 A1 | 9/2017 | Chen |
| 2017/0308824 A1 | 10/2017 | Lord |
| 2017/0314948 A1 | 11/2017 | Tsuneyama et al. |
| 2017/0357408 A1 | 12/2017 | Anglin |
| 2017/0365030 A1 | 12/2017 | Shoham |
| 2018/0005145 A1 | 1/2018 | Lo |
| 2018/0060838 A1 | 3/2018 | Agrawal |
| 2018/0071634 A1 | 3/2018 | Carvallo |
| 2018/0081496 A1 | 3/2018 | Bhardwaj |
| 2018/0089784 A1 | 3/2018 | Yamashita |
| 2018/0091604 A1 | 3/2018 | Yamashita |
| 2018/0092057 A1 | 3/2018 | Yamashita |
| 2018/0101925 A1 | 4/2018 | Brinig |
| 2018/0131767 A1 | 5/2018 | Kozman |
| 2018/0156623 A1 | 6/2018 | West |
| 2018/0158166 A1 | 6/2018 | Tulabandhula |
| 2018/0189918 A1 | 7/2018 | Lu |
| 2018/0211351 A1 | 7/2018 | Kim |
| 2018/0315021 A1 | 11/2018 | Bijor |
| 2018/0339714 A1 | 11/2018 | Smid |
| 2018/0342035 A1 | 11/2018 | Sweeney |
| 2018/0356239 A1 | 12/2018 | Marco |
| 2018/0374350 A1 | 12/2018 | Sweeney |
| 2019/0050775 A1 | 2/2019 | Bijor |
| 2019/0052728 A1 | 2/2019 | Cheng |
| 2019/0109910 A1 | 4/2019 | Sweeney |
| 2019/0137288 A1 | 5/2019 | Rahematpura |
| 2019/0205812 A1 | 7/2019 | Afzal |
| 2019/0206009 A1 | 7/2019 | Gibson |
| 2019/0244318 A1 | 8/2019 | Rajcok |
| 2019/0265703 A1 | 8/2019 | Hicok |
| 2019/0272486 A1 | 9/2019 | Lord |
| 2019/0306258 A1 | 10/2019 | Yamashita |
| 2019/0311629 A1 | 10/2019 | Sierra |
| 2020/0013020 A1 | 1/2020 | Yang |
| 2020/0022101 A1 | 1/2020 | Yamashita |
| 2020/0211070 A1 | 7/2020 | Singh |
| 2020/0258344 A1 | 8/2020 | Brinig |
| 2020/0272957 A1 | 8/2020 | Lord |
| 2020/0272965 A1 | 8/2020 | Tanabe |
| 2020/0273337 A1 | 8/2020 | Sweeney |
| 2020/0322451 A1 | 10/2020 | Cheng |
| 2020/0334987 A1 | 10/2020 | Shoval |
| 2021/0227049 A1 | 7/2021 | Demiralp |
| 2021/0248520 A1 | 8/2021 | Krishnamurthy |
| 2021/0256437 A1 | 8/2021 | Stayner |
| 2021/0312338 A1 | 10/2021 | Stayner |
| 2021/0337047 A1 | 10/2021 | Cheng |
| 2021/0364300 A1 | 11/2021 | Rahematpura |
| 2021/0365848 A1 | 11/2021 | Lord |
| 2021/0407032 A1 | 12/2021 | Kim |
| 2022/0027805 A1 | 1/2022 | Bijor |
| 2022/0044186 A1 | 2/2022 | Hayama |
| 2022/0114501 A1 | 4/2022 | Colon |
| 2022/0223043 A1 | 7/2022 | Sweeney |
| 2022/0412748 A1 | 12/2022 | Lord |
| 2023/0044882 A1 | 2/2023 | Lord |
| 2023/0164228 A1 | 5/2023 | Yamashita et al. |

FOREIGN PATENT DOCUMENTS

| | | |
|---|---|---|
| CN | 111832788 | 10/2020 |
| DE | 10201607712 | 11/2016 |
| EP | 2293523 | 3/2011 |
| GB | 2367979 | 4/2002 |
| GB | 2 501 075 | 10/2013 |
| JP | 2001-188996 | 7/2001 |
| JP | 2004-192366 | 7/2004 |
| JP | 2004-302941 | 10/2004 |
| JP | 2004-362271 | 12/2004 |
| JP | 2010-286908 | 12/2010 |
| JP | 2012-194687 | 10/2012 |
| JP | 2013-175144 | 9/2013 |
| KR | 10-2006-0081193 | 7/2006 |
| KR | 10-2011-0132765 | 12/2011 |
| KR | 10-2012-0079549 | 6/2012 |
| KR | 10-2013-0130978 | 12/2013 |
| KR | 10-2014-0023541 | 2/2014 |
| WO | WO 2002/0006994 | 1/2002 |
| WO | WO 2010142862 | 12/2010 |
| WO | WO 2011/069170 | 6/2011 |
| WO | WO 2011-120161 | 10/2011 |
| WO | WO 2011/132181 | 10/2011 |

OTHER PUBLICATIONS

*Fawcett, Supporting human interaction with the Sentinent Vehicle, 2002, IEEE. pp. 307-312 (2002).
*Koscher, Experimental Security Analysis of a Modern Automobile, 2010, IEEE, pp. 447-462 (2010).
*Muter, A structured approach to anomaly detection for in-vehicle networks, 2010, IEEE, pp. 92-98 ()2010).
*Office Action in CA 3017638 dated Jun. 22, 2022.
*Office Action in CA 3017822 dated Jun. 1, 2022.
*Office Action in KR 10-2016-7034177 dated Mar. 30, 2022 (MG-00008KR).
*Rathore, Integrating biometric sensors into automotive Internet of Things, 2014, IEEE pp. 178-181 (2014).
*Yuan, et al., T-Finder: A recommender System for Finding Passengers and Vacant Taxis, IEEE 2013.
Amey, Utilizing Mobile Phone Technology to Improve Rideshare Services, 2011 Transportation Research Board Annual Meeting.

(56) References Cited

OTHER PUBLICATIONS

Andrew J. Hawkins, Lyft is now suggesting more convenient pickup locations, because a little walking won't kill you. Jun. 26, 2017 The Verge (www.theverge.com).
Borison, Rebecca, "Uber Brings its SUV Fleet to NYC", Jul. 30, 2014, Business Insider, p. 1.
Boufaied, A Diagnostic Approach for Advanced Tracking of Commercial Vehicles with Time Window Constraints, IEEE Transactions on Intelligent Systems, vol. 14, No. 3, Sep. 2013.
Cody Toombs: Maps v.9.19 Introduces New 'Driving Mode' with Traffic Update and ETAs, Audio Toggle for Navigation, and Timeline Seetings [APK Download and Teardown], Jan. 12, 2016 URL: http:// www.androidpolice. Com/2016/01/12/maps-v9-19 -introduces - new-driving-mode-with-traffic-updates -and-etas-audio-toggle-for- navigation- and-timeline-seetings-apk-download- teardown/.
Darrell Etherington: "Google Maps on Mobile Gets Uber Integration and More", May 6, 2014 URL: https//techcrunch.com /2014/05/06/google-maps-on-mobile- gets-uber-integration-and-more.
Dessouky, et al, Real-time scheduling rules for demand responsive transit systems, 1998 IEEE pp. 2956-2961.
Dillenburg, The Intelligent Travel Assistant, IEEE 5th International Conference on Intelligent Transportation Systems, Sep. 3-6, 2002, Singapore.
Edelman, Computing the Mind, Oxford University Press, 2008, pp. xi-36.
EESR in 15809070.4 dated Nov. 8, 2017.
EESR in EP 19165275.9 dated Apr. 18, 2019.
EESR in EP Application No. 15833693.3 dated Jan. 18, 2018.
EESR issued in EP 16735494.3 dated May 18, 2018.
Exam Report No. 1 in AU 2016366687 dated Oct. 6, 2021.
Fay et al, Decentralized control strategies for transportation systems, 2005, IEEE p. 898-903.
Fougeres, A push service for carpooling, 2012 IEEE International Conference on Green Computing and Communications, Conference on Internet of Things, and on Cubler, Physical and Social Computing, 2012.
Goffman, Frame Analysis, Northeastern University Press, 1974, pp. 1-39, 301-344.
Guc, Real-time, Scalable Route Planning using a Stream-Processing Infrastructure, 2010 13th International IEEE, Annual Conference on Intelligent Transport Systems, Madeira Island, Portugal ,Sep. 19-22, 2010.
Gupta, Inside Bluetooth Low Energy, Artech House, 2013, pp. 119-130.
Hilen, Brittany, Uber and Google bring WIFI to cars in Philadelphia, Slashgear, dated Jul. 24, 2014, p. 1, https://web.archive.org/web/20140724201314/http://www.slashgear.com/uber-and-google-bring-wifi-to-cars-in-philadelphia-22338326.
How does Uber Work? available at https://help.uber.com/h/738d1ff7-5fe0-4383-b34c-4a2480efd71e (Year: 2016).
Introducing Scheduled Rides: Plan Your Trip in Advance—Lyft Blog; https://blog.lyft.com/posts/introducing-scheduled-rides, May 23, 2016.
ISR and Written Opinion dated Nov. 21, 2018 in PCT/2018/046257.
ISR and Written Opinion dated Sep. 14, 2017 in PCT/US2017/036430.
ISR and Written Opinion in PCT/US2017/053469 dated Dec. 8, 2017.
ISR and Written Opinion in PCT/US2018/046496 dated Nov. 28, 2019.
ISR and Written Opinion dated Jan. 11, 2018 in PCT/US2017/053514.
ISR/Written Opinion in International Application No. PCT/US2015/046388, dated Nov. 17, 2015.
Lakoff, Metaphors We Live By, University of Chicago Press, 1980, pp. ix-55.
Lalos, A Framework for dynamic car and taxi pools with the use of Positioning Systems, 2009 Computation World: Future Computing, Service Computation, Congitive, Adaptive, Content, Patterns 2009.
McLaren, Sharing Cities, MIT Press, 2015, pp. 21-69.
Megalingam, Automated Wireless Carpooing System for an Eco-Friendly Travel, 2011 IEEE.
Office Action dated Sep. 20, 2018 in EP 15833693.3.
Office Action in EP 15809070.4 dated Sep. 27, 2018.
Office Action in EP 17771000.1 dated Aug. 23, 2021.
Office Action in EP 17783640.0 dated Jan. 12, 2021.
Pelzer, et al., "A Partition-Based Match Making Algorithm for Dynamic Ridesharing", IEEE Transactions on Intelligent Transportation Systems, vol. 16, Issue: 5, pp. 2587-2596 (2015).
Shahzada, Dynamic Vehicle Navigation: An A* Algorithm Based Approach Using Traffic and Road Information, 2011 International Conference on Computer Applications and Industrial Electronics, (ICCAIE 2011).
Trasee, UberEVENTS: A Ride for Every Occasion, Uber Newsroom, Nov. 16, 2015, https://www.uber.com/newsroom/uberevents-a-ride-for-every-occasion/.
Vaqar et al., Smart Protocol for Communication in Mobile Ad Hoc Networks of Vehicles, 2007, IEEE, p. 1-6.
Vaughan-Nichols, Will Mobile Computing's Future be Location, Location, Location? Industry Trends, IEEE Computer Society, 2009 IEEE.
Wirth, Algorithms + Data Structures = Programs, 1976, pp. xii-55.
Written Opinion dated Jul. 26, 2019 in PCT/US2018/046257.
Written Opinion in PCT/US2018/046496 dated Aug. 5, 2019.
Jain, "Context based adaptation of application icons in mobile computing devices", 2013 Third World Congress on Information and Communication Technologies (WICT 2013) pp. 31-36, 2013.

* cited by examiner

DYNAMIC SCHEDULING SYSTEM FOR PLANNED SERVICE REQUESTS

CROSS-REFERENCE TO RELATED APPLICATIONS

This application is a continuation of U.S. patent application Ser. No. 17/366,924, filed on Jul. 2, 2021; which is a continuation of U.S. patent application Ser. No. 16/905,347, filed on Jun. 18, 2020, now U.S. Pat. No. 11,196,838; which is a continuation of U.S. patent application Ser. No. 15/675,683, filed Aug. 11, 2017, now U.S. Pat. No. 10,721,327; the aforementioned applications being hereby incorporated by reference in their entireties.

TECHNICAL FIELD

Examples described herein relate to a dynamic scheduling system for planned service requests.

BACKGROUND

Numerous on-demand services exist to offer users a variety of services: transportation, shipping, food delivery, groceries, pet sitting, mobilized task force and others. Typically, on-demand services leverage resources available through mobile devices, such as wireless (e.g., cellular telephony) devices, which offer developers a platform that can access sensors and other resources available through the mobile device. Many on-demand services include dedicated applications (sometimes referred to as "apps") to communicate with a network service through which an on-demand service is offered.

DETAILED DESCRIPTION

Figure 1:
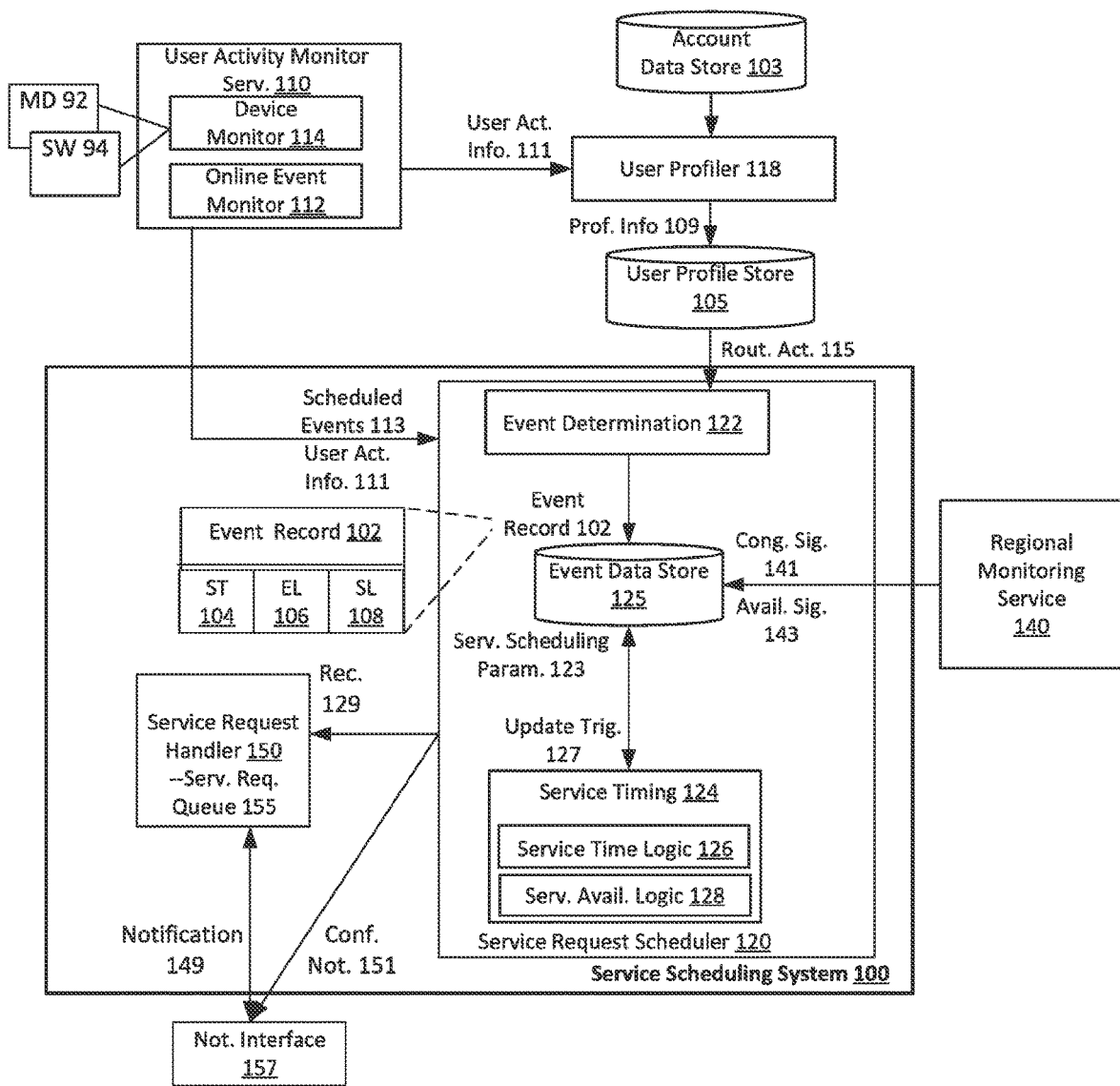
FIG. 1 illustrates an example system to schedule service requests for individual users.

Examples provide a computer system and method to schedule service requests for planned events and activities of the user. According to some examples, a computer system monitors a set of computing resources of a user to determine a planned user event, as well as a set of service parameters for the planned user event. The computer system may further schedule a service request for the planned user event, based at least in part on the event location. Additionally, the computer system may perform an action on behalf of the user with respect to initiating the service request at a scheduled time.

A common objective of on-demand services is to utilize leveraged personal mobile technology to bring convenience to users. For example, urban commuters can eliminate parking by using on-demand transportation services. On-demand transportation services have also implemented technological solutions to provide an easier and more convenient alternative to the conventional approach of hailing transport. In contrast to conventional transport services, on-demand transportation services (i) enable users to interact with their mobile devices to generate service requests, and (ii) match service requests with available service providers who are nearby, so that a service requester can meet a service provider at a location of the requester's choosing. Among other benefits, on-demand transportation services eliminated the manual and uncertain effort that was often required for users to obtain transport service. By leveraging location-aware capabilities of mobile devices, on-demand transportation services can track requesters and service providers to facilitate the one or more parties in meeting at a service start location, as well as to track trips, and to determine fares after completion of trips.

In this context, examples recognize that some users have difficulty with respect to planning to use on-demand transport services for planned or scheduled activities. Some users neglect to take into account, for example, that additional time needs to be allocated for a service provider to be selected, and for the service provider to travel to the requested pickup location. Still further, the availability of service providers can be fluid, meaning that sudden shortages of service providers may occur. Additionally, users do not always track the travel time for receiving the transport service to a destination location.

In this context, examples provide a system that schedules transport service requests for users based on knowledge or information as to when the user intends to arrive at a particular location. In this way, examples such as described can calculate the appropriate service request time, to account for factors such as congestion and service provider availability. By determining when the user should make a transport service request, examples avoid situations where the user arrives too early and wastes time, or arrives late for an event. Given the user's reliance on personal mobile technology (e.g., mobile devices), the timely transmission of transport service requests reduces the user's device time, thus preserving battery life and device use.

Moreover, examples provide for scheduled transport service requests to be dynamic, to reflect events or conditions that require, for example, the planned service request time to be changed. The determination of the service request times for planned service requests is thus dynamic, and subject to update based on, for example, the current location of the user, environmental conditions, information pertaining to the user leveraged from the user's other devices, and other factors which may be outside of the user's awareness.

As used herein, a client device, a driver device, and/or a computing device refer to devices corresponding to desktop computers, cellular devices or smartphones, personal digital assistants, wearable electronic devices, laptop computers, tablet devices, television (IP Television), etc., that can provide network connectivity and processing resources for communicating with the system over a network. A driver device can also correspond to custom hardware, in-vehicle devices, or on-board computers, etc. The client device and/or the driver device can also operate a designated application configured to communicate with the transport arrangement system.

While some examples described herein relate to transport services, the transport arrangement system can enable other on-demand location-based services (for example, a food truck service, a delivery service, an entertainment service) to be arranged between individuals and service providers. For example, a user can request an on-demand service, such as a delivery service (e.g., food delivery, messenger service, food truck service, or product shipping) or an entertainment service (e.g., mariachi band, string quartet) using the system, and the system can select a service provider, such as a driver, food provider, band, etc., to provide the on-demand service for the user.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network-enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

FIG. 1 illustrates an example system to schedule service requests for individual users. In particular, a service scheduling system 100 can be provided to facilitate a user in making service requests that result in the user's timely arrival at a scheduled event. Moreover, the system 100 can update planned service requests based on factors such as user activity, environmental conditions, information pertaining to the user leveraged from the user's other devices, and other events.

According to some examples, the system 100 is implemented as a network service. Accordingly, the system 100 may be implemented on, for example, one or more servers or other network computer machines. The system 100 may be implemented as part of a transport arrangement service, which operates to match incoming transport service requests from requester devices with service providers who are available and in proximity to the start location of the requester transport request. In variations, the system 100 can be implemented as a separate or standalone service that can interface with a transportation arrangement service or user device (e.g., via a service application for the network service). Still further, in other variations, the system 100 can be implemented at least in part on individual user devices. For example, functionality described with the system 100 may be implemented as part of a service application that runs on the mobile devices of individual users.

In more detail, the system 100 may include a service request scheduler 120 and a service request handler 150. The service request scheduler 120 operates to schedule service requests for planned activities of the user. The service request handler 150 includes one or more programmatic processes that can be triggered to perform an action, or series of actions to facilitate the user, or otherwise act on behalf of the user, in making a timely transport service request for a scheduled event.

According to some examples, system 100 may include or interface with a user activity monitor 110 to determine user activity information 111 and scheduled event information 113. The service request scheduler 120 may also access user profile information 109 to determine routine activities 115 of the user, such as a given user's normal commute from home to work, or from work to home. The service request scheduler 120 may process user activity information 111 provided by the user activity monitor 110 to identify planned user activities, including scheduled events (e.g., concert, party, air trip, etc.). The service request scheduler 120 may schedule new transport requests for planned user events. Additionally, the service request scheduler 120 may process respective user activity information 111 to change or update a scheduled transport request of the user. For example, the service request scheduler 120 may delay a service request when it retrieves user activity information 111 that signals the user will not be available for the scheduled service time. The user activity information 111 in this context may be the user's location or information leveraged from the user's linked devices (e.g., smartwatch).

The user activity monitor 110 may include an online event monitor 112 that (with user permission) can access individual user's linked online accounts, such as an online calendar account, a social network account, an email store, a reservation account, etc. The online event monitor 112 may identify scheduled event information 113 from the online resources of the user, which the service request scheduler 120 may receive and process to generate a corresponding event record 102.

As an addition or variation, the user activity monitor 110 includes one or more device monitors 114 that monitor one or multiple computing devices (e.g., mobile device 92, smart watch 94, etc.) of the user to obtain user activity information 111. The user activity information 111 may include or correspond to contextual information for updating scheduled event record 102 determined by the service request scheduler 120. For example, the user activity monitor 110 may include processes to monitor a user's mobile device 92 (e.g., multifunctional wireless telephony/messaging device, tablet device) or multiple mobile devices concurrently (e.g., mobile device 92 and/or smartwatch 94 or other wearable electronic device). The user activity information 111 may include, for example, a user's location information (e.g., such as provided from a satellite location receiver), movement data (e.g., such as provided from an accelerometer and/or gyroscope), device usage data (e.g., usage correlating to execution of different applications on a user's mobile device), and/or activities performed through specific applications (e.g., online shopping application).

In some variations, the profiler 118 may access a user account data store 103 to determine, for example, the user's service request history. From the user's request history, the profiler 118 may determine the destinations for common, favorite or recent service requests. In some variations, the profiler 118 may also process the user activity information 111 to obtain, for example, contextual information that identifies routine activities 115 of the user which may require transport. For example, the profiler 118 may identify a common destination for the user (e.g., user's work address) based on the user's location during the work day, even though the user's work address is not one of the user's favorite or recent destinations through the transport service (e.g., the user may normally drive himself to work). The profiler 118 may store determined routine activities 115 as part of the user profile 109 in the user profile store 105. In this way, the profiler 118 may determine an activity profile of the user.

According to some examples, the service request scheduler 120 includes an event determination component 122 and a service timing component 124. The event determination component 122 may process user activity information 111 and the scheduled event information 113, as provided by the user activity monitor 110, in order to determine a service request queue 155 of planned service requests for the user over an upcoming time period. The service request queue 155 may include service requests for those events which are determined to be transport events (e.g., events for which the user will likely request transport). In some examples, the planned service requests may be determined for routine activities 115 (e.g., user going to work from home, user going home from work), scheduled event information 113 (e.g., user purchases theatre tickets for a particular day and time) and/or detected activities determined from user activity information.

In one implementation, the event determination component 122 implements a rules engine to determine when a detected activity, calendar event, or routine activity is to be treated as a scheduled event record 102. A scheduled event record 102 may identify events (or planned activities) of the user which correspond to events which the user may wish to attend, and possibly travel to. In some variations, the event determination component 122 generates an event record 102 for each activity or event that satisfies a confidence threshold (e.g., probability determination) as to being a transport event (or an event which the user will likely wish to receive a transport service for in connection with a corresponding event location). In one implementation, the event determination component 122 may generate the event record 102 using a normalized or common format. The event determination component 122 may populate the event record 102 with metadata that identifies (i) a start time parameter 104, corresponding to a start time (or window of time) for the user to arrive at the location of the activity, and (ii) an event location parameter 106 (e.g., street address or geographic coordinate of activity). The scheduled event record 102 may also include a service start location parameter 108, corresponding to a predicted or determined start location for the user in a duration immediately preceding the event start time. In some examples, the service start location 108 may be predicted based on user activity and/or an activity profile of the user. In variations, the service start location parameter 108 may be dynamic, in that the start location may correspond to the user's current location at the service request time. Given the service request time may depend on the user's current location, examples provide that the service request scheduler 120 monitors the user's activities (via the user activity monitor 110) to update the parameters of the event record 102. Each event record 102 that is generated by the event determination component 122 may also be associated with an identifier for the user. As described below, the user's service request queue 155 may be determined over a given time interval (e.g., every 4-hour time interval during the day) from scheduled event records 102 that are stored with the event data store 125.

In some examples, the event determination component 122 may generate scheduled event records 102 as a recommended set of scheduled service requests. The service request scheduler 120 may communicate a recommendation 129 that identifies information from a scheduled event record 102 (or set thereof). The recommendation 129 may be provided for the user to confirm or verify as relating to a transport event, meaning the user's confirmation identifies an event for which the user may wish to receive a transportation service. For example, the service request scheduler 120 may send a confirmation notification 151 (e.g., an in-app notification, a calendar update, etc.) to the user, identifying information from the scheduled event record 102 of the recommended set. In some variations, the confirmation notification 151 may prompt the user to respond and confirm (or discard) that the user intends to use a transport service in connection with an event identified in the scheduled event record 102. If the user provides the confirmation input, then the scheduled event record 102 may be marked as a transport service event. Those event records 102 which are marked by confirmation or default as identifying transport service events may be made part of a user's service request queue 155. Depending on implementation, events which are not confirmed or discarded may also be maintained in the event data store 125. If the user provides a negative confirmation (e.g., discards the notification, declines the recommendation, etc.), the corresponding event record 102 may be removed from the event data store 125.

In some examples, the event determination component 122 may format recommendations 129 to include pre-populated information that identifies the event (e.g., by descriptor, location, date and start time), an estimated service start time (e.g., pickup time), and selected or default service type. In some variations, recommendations 129 may be prioritized, with higher ranked determinations being presented more prominently to the user (e.g., on the user's mobile device 92 and/or smart watch 94).

In some examples, the event determination component 122 may utilize a rules engine in order to determine which event records 102 signify transport service events. In some examples, the user's response to recommended event records 102 may be used to develop the user's profile, which may be stored in the user profile store 105. For example, the event determination component 122 may determine that the user is likely to want transportation services for certain events (e.g., restaurant reservations) or types of events (e.g., routine work event), for certain days or times of a week (e.g., Friday nights), or for certain locations (e.g., in an urban area). The event determination component 122 may also process determined events to cancel or modify planned service requests as needed. For example, the routine activities 115 (e.g., service request to transport user to work) may be canceled on a holiday, or when a calendar event indicates the user is out of town.

Still further, the event determination component 122 may include logic to keep or discard a scheduled event record 102 which receives no user response. The event determination component 122 may base the determination on, for example, previous user responses in confirming or discarding event records 102. For example, the event determination component 122 may determine to keep or discard a given event record 102 based on the user's profile information 109 (as determined from the user profile store 105), which may include an aggregation of past user interaction with confirmation notifications of the event determination component 122. Based on past interactions, the event determination component 122 may determine the tendency or preference of the user to (i) confirm scheduled event records 102 which are of interest to the user as transport events, versus the tendency of the user to discard event records which are not of interest as transport events to the user, and/or (ii) accept or act on scheduled events which have not been confirmed. In such examples, the user's response to the confirmation notification 151 may be recorded with the user's profile store 105. The user may also provide input to alter or modify the event record 102, such as to specify a particular type of service (e.g., large vehicle) for the event and/or specify an additional start location (e.g., address of friend). Alterations or modifications to the event record 102 to specify a particular type of service may also be dynamically adjusted based on information leveraged from the user's linked apps (e.g., social media events indicating that user will be attending an event with a friend to generate an option for selecting an additional service location) or provided input (e.g., the user's number of checked bags may be obtained from a user's flight ticket information to indicate whether a larger vehicle is necessary for the user's service request).

In variations, the user's profile information 109 may also store settings, where the user may specify their preference for having scheduled event record 102 made part of the user's service request queue 155. For example, the user may be able to select certain types of activities (e.g., activities generated on a particular on-line calendar or for a particular type of event) as becoming part of the user's service request queue 155 automatically, upon detection by the event determination component 122.

The service timing component 124 may implement operations to determine service scheduling parameters 123 for individual event records 102 of the event data store 125. For example, the service scheduling parameters 123 may correspond to (i) a service time to service the user to the event location from an expected or determined user location, and (ii) a service arrangement time, to select an available service provider for the user and to have the service provider arrive at the start location identified by the corresponding event record 102. In determining the service scheduling parameters 123, the service timing component 124 may utilize a service start location, as determined from, for example, the start location parameter 108 of the corresponding event record 102, a current or recent location of the user, or an expected or planned location of the user (e.g., as determined from user profile information). In variations, the service timing component 124 determines relative information for updating an event record 102 that identifies an upcoming service request, based on user activity information 111, as provided from the user activity monitor 110. The user activity information 111 may identify, for example, the user's current location. Accordingly, the service timing component 124 may update a given event record 102 based in part on the current location of the user.

In some examples, the service timing component 124 may be triggered to update the service scheduling parameters 123 of a scheduled event record 102 by monitoring user activity and/or environmental conditions during a given time interval that precedes the determined start time of the corresponding event (e.g., preceding 2 or 4-hour interval before start time of activity). For a given event record 102, the service timing component 124 determines scheduling parameters 123 that identify when a corresponding service request for the event record 102 should be made. The service timing component 124 may identify, from the scheduling parameters 123, a service request time, corresponding to an interval of time preceding a corresponding event's start time, when the corresponding service request of a given record is timely, meaning the service request is not made too soon (so that the user does not depart too early for the event location) and not too late (so that the user arrives at the event location on time). The service request time may be based on time intervals that include (i) a service time for a service vehicle to complete the service from the service start location to the event location, and (ii) a service provider arrival time, corresponding to the time interval marked by the arrival of the service provider, following a transmitted service request of the user. As described with examples, the service time may be subject to change, as factors such as congestion, roadwork and other types of conditions may cause delays or variations from a planned or normal trip time of a given route. Likewise, the service provider arrival time may also fluctuate based on the availability of the service providers and the respective proximity of available service providers to the service start location. For example, the availability of the service provider may fluctuate based on factors such as the location of available service providers and the number of requesters at a given time interval. As described in greater detail, some examples plan a service request for user to include a real-time determination for the arrival time of a matched service provider at the service start location, as well as the service time between the service start and event locations.

The service request scheduler 120 may also account for uncertainty in the location of the user at the time the service request is to be made for a given event record. In some examples, the service timing component 124 may utilize, for example, the user activity monitor 110 to repeatedly or continuously update the user's location for a given event record 102, during a time interval preceding when a service request is to be made for a corresponding event. The service timing component 124 may update the corresponding scheduled event record 102 based on the current location (or service start location) of the user being determined or otherwise updated (e.g., such as based on the user's current location) in the time interval leading up to when the service request is made.

Accordingly, in a given time interval preceding a start time of a given event record 102, the service timing component 124 may utilize the service time logic 126 to estimate the likely service time for a service provided to the user. The service time may be based at least in part on monitoring of the user's activity information 111 (e.g., current location), as well as environmental conditions, such as congestion and service provider availability (e.g., as determined by the regional monitoring service 140, described below).

The service timing component 124 may also utilize service provider availability logic 128 to determine an expected time interval between when a given service provider is matched to the service request of the user, and the estimated service provider arrival time, marking when the service provider arrives at the service start location. In this way, the service timing component 124 may, for example, make separate determinations of (i) an expected time duration for matching a service provider from an available pool of service providers to a service request of a given event record 102; and (ii) an expected duration (e.g., travel time) for the selected service provider to travel and meet the user at the service start location (e.g., as determined from the activity information 111).

According to some examples, the system 100 communicates with the regional monitoring service 140 to receive environmental input parameters that may impact the service scheduling parameters 123. By way of example, the regional monitoring service 140 may include interfaces to third-party information sources that include weather information, traffic reports, regional event information (e.g., concerts), as well as information about other environmental conditions that can impact service transport times and provider arrival times. By way of example, the regional monitoring service 140 may identify conditions which increase congestion, or otherwise reduce the travel speed of vehicles on the roadways near the service start or event locations. In some examples, the regional monitoring service 140 operates in connection with a transport arrangement service (e.g., see FIG. 2) to monitor position information (e.g., location and speed) of service provider vehicles in the vicinity of a service start location, event location or road network segment between the service start location and the event locations. Based on the monitoring, the regional monitoring service 140 can detect conditions of roadway congestion which may impact either the service providers arrival time or the service transport time of the service record 102. By detecting conditions of roadway congestion and by monitoring location and speed of service provider vehicles, the regional monitoring service 140 may generate, for given intervals of time, congestion signal 141 to indicate a relative speed of service provider vehicles on the roadway in a region that includes the service start location and/or the event location.

In some examples, the service request scheduler 120 may communicate with the regional monitoring service 140 to detect, for example, a major accident that will significantly delay the travel time of the user. The service request scheduler 120 may change the service request time for the planned service request to accommodate the possibility of a lengthy commute.

Additionally, the regional monitoring service 140 may monitor for the availability of service providers. Depending on implementation, the availability of service providers may be based on, for example, one or more of the total number of service providers in the vicinity of the event start location, the total number of available service providers, the number of requesters in the vicinity of the service start location, and/or the vicinity of the service start location to an available provider. The regional monitoring service 140 may generate, for the given intervals of time, availability signal 143, which may be indicative of a number of available service providers in a given time interval as compared to an expected or actual number of requesters.

In some examples, the service time logic 126 utilizes congestion signal 141 (as provided by the regional monitoring service 140) that is specific to the event location, service start location, and/or route between service start and event location. In determining the service scheduling parameter 123, the service provider availability logic 128 may utilize service provider availability signal 143 as determined from the regional monitoring service 140. As an addition or variation, the service provider availability logic 128 may utilize historical information for determining the availability of service providers and/or time for service providers to arrive at the start location. In such examples, the historical information may be specific to the location, time day of week, time of day etc.

According to some examples, the congestion and/or availability signals 141, 143 may be repeatedly determined and associated with geographic areas that encompass service start locations, event locations and routes between service start and event locations. The congestion and/or availability signals 141, 143 may be associated with, for example, corresponding event records that are stored in event data store 125. As the start time for given events approach, the service timing component 124 may utilize values of the congestion and/or availability signals 141, 143, in order to take into account for timing variances (e.g., delays) resulting from, for example, traffic congestion and/or lack of available of service providers.

In some variations, the event determination component 122 records the type or source of a determined event for individual event records 102. The service request scheduler 120 may utilize or communicate with other types of monitors to update event records 102, based on the type or source of the determined event. For example, the event determination component 122 may record a planned flight, and the service timing component 124 may utilize a flight tracker database (which may be provided by a third-party) to monitor for the departure time of the requester's flight. In this way, when a requester's flight is delayed, the service request queue 155 of the user is automatically updated to reflect the flight change.

The service request handler 150 may handle a service request queue 155, identified from the event records 102 of the user which identify upcoming transport events for an upcoming time interval (e.g., 12 hours or a day). The service request queue 155 may be based on scheduled event records 102 which the given user has confirmed or not discarded. The service request handler 150 may implement one or more types of actions to handle individual entries of the user's service request queue 155. In one implementation, the action(s) of the service request handler 150 is to notify the user at an appropriate time to initiate a transport service request. The service request handler 150 may, for example, initiate transmission of user a notification 149 (or a series of notifications) through a notification interface 157 that renders the notification using a service application running on a user's device. The notification 149 may provide the user with a recommendation to make a transport request at a given service request interval, as determined by the service timing component 124. In variations, the service request handler 150 may utilize an alternative notification interface 157 to communicate the notification 149 as, for example, a Short Message Service (SMS) protocol. In variations, the notification interface 157 may enable other forms of notifications, such as by triggering the placement of a phone call (e.g., via the user's mobile device 92) or alarm chime (e.g., via the user's smart watch 103). The notification 149 itself may be selectively sent at a given time interval preceding the determined service request time. Additionally, the notification 149 may include content to indicate a time when the user should make the transport service request (e.g., "Request transport in 5 minutes (3:45 PM) to arrive at your event at 4:15.").

As an addition or alternative, multiple notifications may be sent at different time intervals preceding the service request time. The number of notifications, as well as the time preceding the service request when the user prefers to receive one or more notifications, may be determined by a user profile. The user profile information 109, for example, may indicate a preference of the user as to a number or frequency of notifications, as well as lead time preceding the service request time when individual notifications should be sent. The user profile information 109 may also specify notification preferences which are specific to a type of notification (e.g., when a user receives a notification that identifies the service request time for a routine destination such as the user's work address).

As an addition or variation, the service request handler 150 may schedule a service request action with a user's calendar application (e.g., running on a user's mobile device) or online calendar/scheduling service. The service request may be scheduled within, for example, a window of time during which the user should make the service request to arrive on time at a corresponding event of a given event record 102. Thus, the service request action may be scheduled on the calendar at a different time than the event of the service planning record, in order to account for the service time and the service arrival time.

As an addition or variation, the service request handler 150 may generate or otherwise configure a user's requesting device to include an application feature that is selectable (e.g., selectable icon appearing on a touchscreen of a user device) to cause the user device to initiate the service request. In addition, the selection of the application feature by the user may cause the user's requesting device to transmit a complete service request, utilizing service parameters specified in the corresponding event record 102 (e.g., service start location, destination as event location).

Still further, in some variations, the service request handler 150 may automatically make the service request for the user at a determined service request time. For example, the service request handler 150 may automatically make a transport service request for the user when the corresponding event record 102 has been confirmed or verified by the user. As a variation, the service request handler 150 may make the transport service request on behalf of the user, after providing a notification or alert to the user to cancel the automated action of the service request handler 150 before the service request time.

In some examples, the service request handler 150 can perform any one of multiple possible actions (such as described above) to handle planned service requests of the user's service request queue. The service request handler 150 may determine the action that is to be performed on behalf of the user, as well as parameters for performing the action (e.g., time when the action is to be performed) based on, for example, (i) whether the user has confirmed or verified the event record 102 as being related to a travel event, (ii) the type of event (e.g., routine) or scheduled activity, (iii) previous instances as to how the planned service request was handled, and/or (iv) preferences of the user. The user's profile information 109 may specify, for example, by settings or past behavior, the type of action the user prefers to occur for scheduled service events of the user. For example, the user's profile information may indicate one of multiple possible alternative actions that the service request handler 150 may perform, such as (i) automatically request transport service for the user at an appropriate time for an activity of a given event record 102; or (ii) provide the user with a programmatic mechanism to trigger transmission of the service request at an appropriate time for the given event record 102.

In some examples, the preferences of the user may be determined by monitoring the user's behavior in time intervals preceding scheduled events for which the user is to utilize a transport service. The profiler 118 may, for example, receive user activity information 111 from the user activity monitor 110 during the time interval preceding when the user makes a service request for a given event record 102. The profiler 118 may observe instances when, for example, a notification receives a response from the user, or instances when a service request is canceled by the user, in determining the user profile for how at least some types of planned service requests are to be handled.

In some examples, the service request scheduler 120 can also process an event record to identify additional service parameters, such as (i) a type of transport which the user may prefer (e.g., pooled transport, large vehicle); (ii) a number of additional passengers or service locations; and/or (ii) conditions of the provided service (e.g., specific sequence of service stops). The service request scheduler 120 may schedule the planned service request, including the service request time, to account for such additional service parameters. For example, the service availability determination may take into account that the type of service the user may wish to receive may be sparser, or take longer to arrive. Additionally, the service request scheduler 120 may plan in advance for additional time that may be required for the service provider to pick-up an additional passenger for the user's planned event. By way of example, a user may purchase two tickets for a planned event (e.g., concert). The system 100 may schedule the transport service request for the user, with the service request time accommodating an additional service stop to pick-up another rider. The scheduled service request may further be subject to dynamic updates based on, for example, user location, traffic or other environmental conditions.

The service request scheduler 120 can also implement an intelligent rule-based workflow in scheduling service requests for the user based on the scheduled events of the user. For example, the event determination component 122 may determine that the user has purchased a return plane ticket between two cities, and further that the user has made a reservation at a hotel in the destination city. The service request scheduler 120 may use the event of the user's airplane trip to the destination city to schedule two service requests (i) from the user's current location to the airport, and (ii) from the destination city airport to the hotel. Each of the scheduled service requests may be monitored and changed by, for example, checking a third-party flight service for delays and flight arrival times. In the same example, the service request scheduler 120 can schedule two additional service requests, one from the hotel in the destination city to the airport, and one from the airport of the departure city to home. When the airline ticket is purchased, the service request scheduler 120 can also check for baggage check-in to determine, for example, a type of service or service vehicle the user should receive.

Still further, in some examples, the service request scheduler 120 can override scheduled service requests based on detection of other scheduled events. For example, a user may receive transport to work as a routine activity, with the service request being timed to occur so that the user arrives at 7:00 AM. If the event determination component 122 detects that the user has a calendar invite for a meeting at a time earlier than his normal arrival at work, the service request scheduler 120 can cancel the original (or usual) planned service request and generate a new service request to enable the user to arrive at work on time for the meeting. Moreover, the service request scheduler 120 can configure the scheduling of the service request based on contextual information, such as the user's habits, etc. (as determined from the user profile). For example, the service request scheduler 120 may anticipate the user's preference to arrive 30 minutes early for a calendared call, based on perceived habits of the user, as determined by, for example, the profiler 118.

In some variations, the service request scheduler 120 may schedule multiple actions for the user, including actions which are not directly related to scheduling service requests. For example, the service request scheduler 120 may schedule to waken the user at a particular time, and/or to monitor (e.g., via sensor data obtained from the user's mobile device) when the user wakes up. In some implementations, the service request scheduler 120 may change the service request time for a planned service request based on, for example, the user's activity. For example, the service request scheduler 120 may receive motion sensor data and/or alarm clock data which indicates the user may have overslept. The service request scheduler 120 may delay the service request time for the planned service request by a given number of events, or until a particular event is detected (e.g., the user walks outside of the house, as detected by device sensors and/or user's location).

Figure 2A:
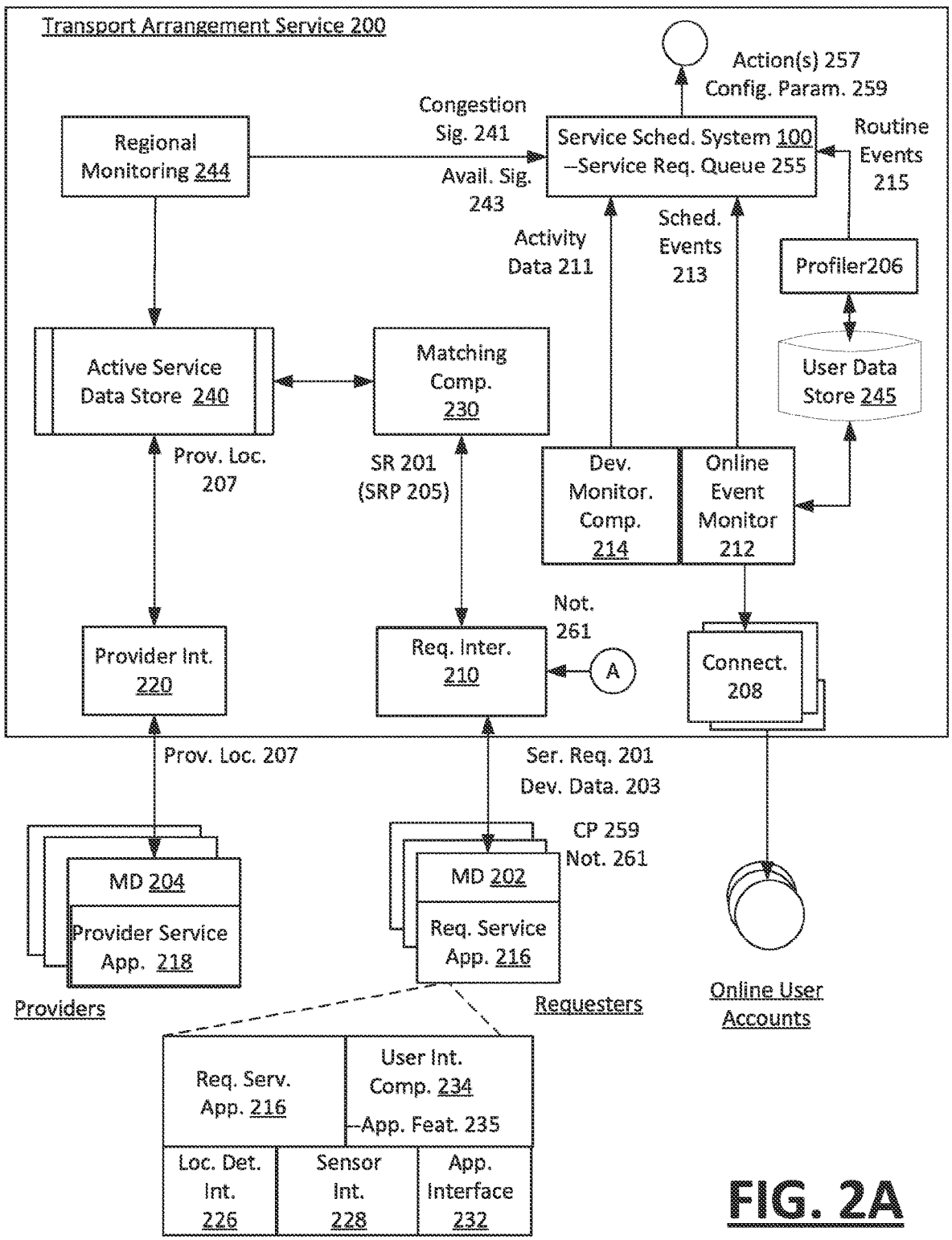
FIG. 2A illustrates an example arrangement service that includes a service scheduling system such as described with an example of FIG. 1.

FIG. 2A illustrates an example transport arrangement service that includes a service scheduling system such as described with an example of FIG. 1. With respect to FIG. 2A, a transport arrangement service 200 includes functionality for implementing a service scheduling system 100, such as described with an example of FIG. 1. According to some examples, the transport arrangement service 200 is implemented as a network computer system that operates to match service requests of requesters with service providers who fulfill the service requests. In some variations, the transport arrangement service 200 is implemented as a network computer system that implements a platform of distributed functionality. When implemented as a distributed platform, the service 200 may incorporate functionality implemented by servers and mobile devices of users (e.g., users and service providers).

In an example of FIG. 2, the transport arrangement service 200 may include a requester interface 210, a provider interface 220, a matching component 230, and a service data store 240. The requester interface 210 communicates with requester service applications 216 that execute on respective mobile devices 202 of requesters. When launched, each requester service application 216 may establish a secure and persistent communication channel with the service 200 using a corresponding instance of the requester interface 210. Among other operations, the requester interface 210 may provide instructions and otherwise configure operations of the service application 216 in obtaining and transmitting device data 203 to the service 200.

The provider interface 220 may also communicate with provider service applications 218, executing on mobile devices 204 of individual providers of a group of providers. The service 200 may establish a secure and persistent communication channel with individual service applications 218 executing on corresponding mobile devices 204. Each provider service application 218 may execute to obtain and transmit device information, including the current location 207 of the provider device 204. Each provider may also be associated with a vehicle that the provider operates to transport requesters from a service start location to a destination.

In an example, a provider may interact with the provider service application 218 to indicate their respective status as being available to provide service, or alternatively as offline or unavailable. Once the service provider is online, the provider service application 218 may repeatedly or continuously transmit the provider's location information 207. The communications from the provider device, including the provider's location information 207, may be received by the provider interface 220. The provider interface 220 may store and update a record for the service provider with the active service data store 240. By way of example, the record for the service provider may identify the current location 207, as well as the status and service identifier of the provider. The provider interface 220 may repeatedly update the service provider record as to the current location and service status of the service provider, based on repeated communications with the service provider's device 204.

The requesters may utilize the respective requester service applications 216 to transmit service requests 201 from their respective mobile devices 202. The service requests 201 may be received by the requester interface 210, with each service request specifying a set of service parameters 205 (e.g., service start location, destination location). The matching component 230 may use the set of service parameters to match individual service requests 201 to corresponding providers. The matching component 230 may perform the matching based on criteria that includes proximity of available service providers (as determined by the current location 207 of the service provider) to the service start location (e.g., requester current location, pickup location, etc.). When the matching component 230 performs a match, a confirmation communication may be communicated to the requester via the requester interface 210. The service provider may also receive an assignment via the provider interface 220. When a service provider is matched, the service provider may also receive the service start location, and the service provider may operate a respective vehicle towards the service start location, where the requester may be picked up and transported to the destination.

According to some examples, requester interface 210 communicates with the requester service applications 216 to receive service requests 201 and device data 203. Each service request 201 may include service parameters 205 that identify, for example, a start location and a destination. The requester interface 210 may also instruct the individual service applications 216 to interface and obtain data from (i) a location determination component of the mobile device (e.g., satellite receiver) via a location determination interface 226 of the requester service application 216; (ii) one or more motion sensors (e.g., accelerometer and/or gyroscope) of the mobile device 202 via a sensor interface 228 of the requester service application 216; and/or (iii) another application (e.g., alarm clock, calendar application) or application data set of the mobile device 202, via a corresponding application interface 232 of the requester service application 216.

According to some examples, the requester interface 210 may receive the request 201, and forward the request 201 to the matching component 230. The matching component 230 determines a pool of available service providers from the 240, based at least in part on a comparison of the current location of the service providers and the service start location of the service request. From a pool of available service providers, the matching component 230 selects a given service provider for the service request 201. Once selected, the matching component 230 changes the service state of the service provider, and the provider interface 220 may communicate the service parameters of the matched service request to the requester via the requester service application 218. Depending on implementation, the service state of the service provider may be changed from, for example, available to travel to the start location (e.g., when the service provider is first matched to the service request and begins to travel towards the service start location), to providing service (e.g., beginning with when the requester enters the vehicle of the service provider), and from on-trip to available (e.g., when the service provider nears or arrives at the destination of the service request).

In some examples, the requester service application 216 includes a user interface component 234 that includes a set of selectable application features 235 for requesting services. Each application feature 235 can be selected to generate a service request 201 for the service 200, with each application feature 235 being individually assigned to a particular destination. For example, one or more of the application features 235 may each be assigned to a favorite destination of the user. With the user's selection of the application feature 235, the service application 216 may automate generation of a service request that specifies a destination corresponding to the assigned location of the application feature 235.

According to some examples, the service 200 includes an online event monitor 212 that monitors online accounts and other resources of individual users to detect and record scheduled events 213 which may require transport for the user. In an implementation, the online event monitor 212 utilizes user credential information (e.g., login and password), as provided by the user data store 245, to identify and connect with a corresponding third-party network service that hosts a corresponding user account (e.g., online user calendar, email store, reservation store, social network site, etc.). In one implementation, the online event monitor 212 may utilize any one of multiple possible service connectors 208 (each for specific third-party online services), in order to access an online account or resource of the user to obtain scheduled events 213.

In some examples, the service 200 includes a device monitoring component 214 that instructs, or otherwise configures operation of the requester service application 216 to return device data 203 that is indicative of user activity. By way of example, the device monitoring component 214 may trigger the requester service application 216 to communicate, over a given time interval, device data 203 corresponding to (i) location information, indicating a current location of the user, (ii) sensor data, indicating, for example, movement of the mobile device 202, and (iii) application data, corresponding to, for example, local calendar records and application data of the requester's mobile device 202, as well as notifications or other outputs from third-party and/or native application resident on the mobile device 202. In this way, the device monitoring component 214 may determine user activity data 211 from the device data 203. The device monitoring component 214 may communicate the user activity data 211 to the service scheduling system 100.

According to some examples, the system 100 utilizes scheduled events 213 to determine a service request queue for individual users. The service request schedule may utilize activity data 211 and scheduled events 213 to determine a recommended set of planned service requests. In one implementation, the system 100 generates notifications for the user to view identified scheduled events 213, in order to designate select events as being transport events (or events which the user elects to receive transportation services). In variations, the system 100 may automate the designation of at least some events as requiring transport services, based on, for example, past user designations.

A profiler 206 may also access user profile information via the user data store 245, including, for example, prior service requests of individual users, as well as prior user designations by which certain scheduled events are also selected (or otherwise accepted) to be transport events. The profiler 206 may also identify routine events 215 (e.g., user traveling to work) for the system 100.

In some examples, the system 100 may generate a service request queue 255 for individual users. The service request queue 255 may identify scheduled event record 102 that have been designated or determined (e.g., by default or through user profile) as transport service events. For each transport service event, the service request queue 225 may specify an event identifier, an event location, an event start time, and a service request time (or window of time). As described with an example of FIG. 1, the service request time may account for (i) the expected duration for a transport vehicle to travel from the service start location to the event location, (ii) the expected duration of time to locate an available service provider, and (iii) an expected time of travel for the service provider to arrive at the service start location. As described with other examples, the determination of the service request time may be impacted by environmental conditions, such as roadway congestion and service provider availability. The environmental conditions may impact the service request time based on location and time when such conditions are present.

In some examples, the system 100 utilizes the activity data 211 to update scheduled service requests of a given user. In an example, the system 100 may monitor user activity, in order to determine activity data 211 for requesters who have scheduled service requests in an upcoming duration of time. The monitored activity data 211 may identify for example, the requester's current location, which may also coincide with the service start location when the transport request is made. Thus, if the user changes location in an interval preceding the scheduled service request, the user's changed location can be detected and used to update the particular entry from the user's service request queue 255.

According to some examples, a regional monitoring component 244 may monitor a given region using the active service data store 240. The active service data store 240 may track service providers by location and status. The regional monitoring component 244 may monitor the active service data store 240 to identify, for example, service providers that are operating on roadways but moving at slow speeds. As an addition or variation, the regional monitoring component 244 may also identify sub-regions where there is an undersupply of service providers. The regional monitoring component 244 may include logic to generate geographic coordinates and/or route segments that identifying locations which are affected by congestion or other environmental conditions. The regional monitoring component 244 may further assign values, in terms of, for example, units of time, weights or other parameters, to reflect a presence and/or magnitude of congestion or other environmental conditions at a geographic coordinate and/or route segment. The geographic coordinate and/or values reflected by the environmental conditions may be communicated as congestion signal 241 to the system 100.

As an addition or variation, the regional monitoring component 244 may repeatedly sample service provider availability over a given geographic region. In an example, the service provider availability may be based at least in part on a number of service providers who are (or will be within a given duration of time) available to provide transport services within a given sub-region. As an addition or variation, the service provider availability may also be based on a number of requesters (or expected requesters) over the same duration. The regional monitoring component 244 may determine a service availability value, corresponding to a time value or weight that impacts timing parameters, such as the expected duration for selecting a service provider, and/or a time of travel for the selected service provider to arrive at the service start location. The regional monitoring component 244 may communicate the service availability value as the availability signal 243.

Some examples provide for the regional monitoring component 244 to communicate respective congestion and availability signals 241, 243 in response to determining that environmental conditions are present at a given area which deviate from an expected or default measure of the condition by more than a designated threshold amount. For example, the regional monitoring component 244 may assign default travel times for road segments, based on observed or model traffic patterns. As such, the regional monitoring component 244 may take into consideration normal or expected congestion over specific time intervals. In such an example, the regional monitoring component 244 may generate congestion signal 241 for a corresponding set of geographic coordinates or region in response to determination of the congestion is significantly different than what is expected. For example, the regional monitoring component may generate the congestion signal 241 for a particular location or sub-region when the observed congestion changes a traversal time of a vehicle across the route by more than 2 minutes.

In variations, the system 100 may trigger the regional monitoring component 244 to generate respective congestion and or availability signals 241, 243. For example, the system 100 may repeatedly query the regional monitoring component 244 for congestion and/or availability signals 241, 243 in order to determine those scheduled service requests of a given number of users that may be impacted by environmental conditions.

In some examples, the system 100 may implement programmatic processes to handle, or otherwise act on planned service request entries of the service request queue 255 for individual users. Depending on implementation, different types of actions 257 may be performed by the system 100 in a time interval that immediately precedes a service request time for a scheduled transport event of the user. In some examples, the system 100 may perform different actions for different types of scheduled transport events. For example, a routine event (e.g., user traveling to work) may receive one type of action (e.g., notification), while a reservation event (e.g., user going to concert or dinner) may cause the system 100 to implement a different kind of handling action.

In an implementation, the system 100 may perform the action 257 of sending a notification 261 to the requester that identifies information about a user's scheduled service request. The notification 261 may be communicated through, for example, the service application 216 (via the requester interface 210), a messaging application, and/or a calendar service or application (e.g., residing on the mobile device 202). The notification 261 itself may include separate timing parameters, to provide the user with lead time to act on the notification and make the scheduled service request at the appropriate service request time indicated in the corresponding scheduled event record 102. Depending on user preference, a user may receive several notifications at different times leading up to the service request time. Still further, in some variations, one or more notifications 261 may be triggered by monitoring the user's activity data 211 for predetermined markers (which may be stored as part of the user's profile).

For example, based on user profile or preference, the user may receive a first notification for a scheduled service request to transport the user to work when the user is deemed to be awake. To determine when the user is awake, the system 100 may monitor user activity data 211, such as motion sensors that indicate when the mobile device was first moved in the morning, or when alarm notifications, indicating the user's alarm clock has sounded.

As an addition or variation, the system 100 may generate a set of configuration parameters 259 that configure the user interface component 234 of the service application 216, running on the user's mobile device 202. The configuration parameters 259 for a particular scheduled transport event may be active for a set window of time (e.g., one hour) preceding the service request time of the event. The duration in which the configuration parameters 259 are active may be based on, for example, user preference and/or the type of event.

In one implementation, the configuration parameters 259 include configuring an application feature 235 of the user interface component 234 to appear for an interval of time preceding the service request time of the corresponding scheduled transport event. The application feature 235 may be configured to associate service parameters 205 of a service request to information of the corresponding scheduled event record 102 of the scheduled event. Thus, the configuration parameters 259 may configure the application feature 235 to use the event location as one of the service parameters 205 for the corresponding service request 201. The application feature 235 may persist on, for example, a home interface, calendar interface or request interface of the service application 216. As an addition or variation, the application feature 235 may include linked features in other applications. For example, the application feature 235 may be selected from the service request interface of the service application 216 to transmit a service request 201 to the service 200, while a separate calendar application running on the user's mobile device may also include a short-cut feature that links to the application feature 235.

Still further, in other variations, the application feature may be dynamic in appearance, to indicate information about the scheduled event, including an amount of time remaining until the service request time and/or the event start time.

As an addition or variation, the system 100 may handle the scheduled service request by making the service request 201 on behalf of the user. In an example, the service 200 may deploy a trigger or other programmatic mechanism resident on the service application 216 to make the service request 201 at the service time indicated by the scheduled event record 102 of the scheduled service request. In some variations, the service 200 may utilize a server or network side agent or component to generate the service request 201 on behalf of the user.

Figure 2B:
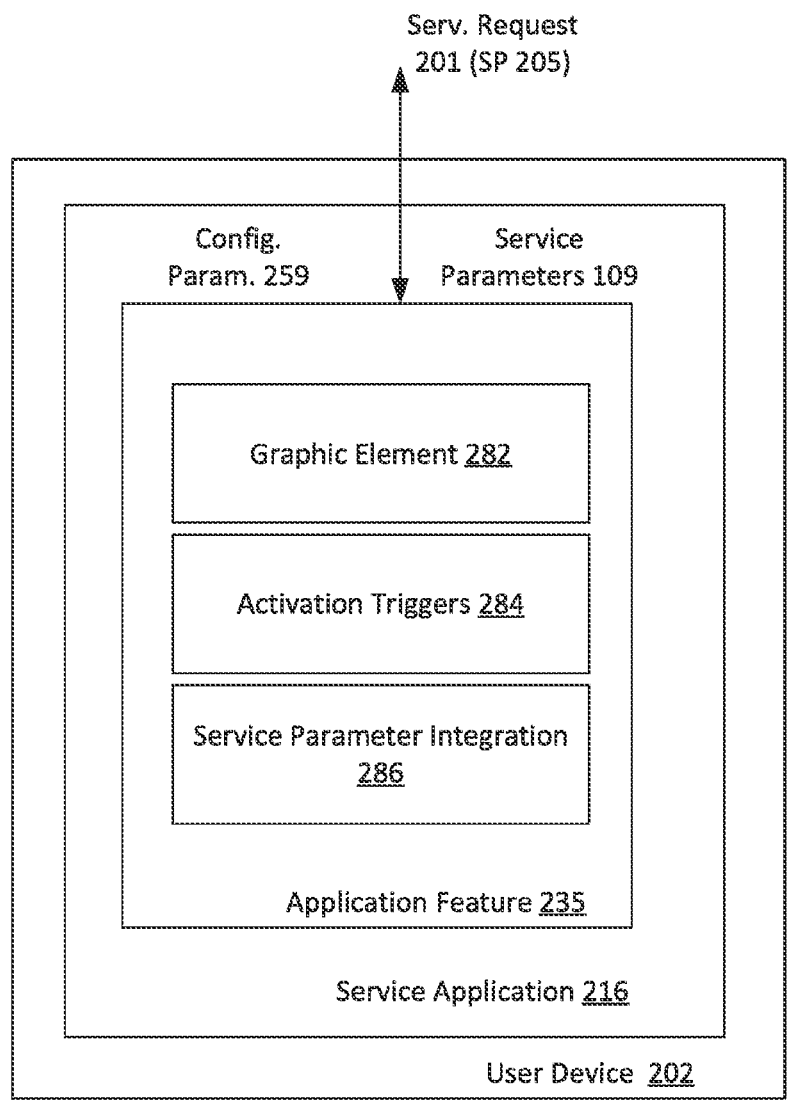
FIG. 2B is a block diagram representation of an application feature, according to one or more examples.

FIG. 2B is a block diagram representation of an application feature, according to one or more examples. According to some examples, the service application 216 may provide a set of one or multiple application features 235 on a given interface when the service application 216 is executed on the requester's mobile device 202. Each of the application features 235 may be selectable to trigger the requester's mobile device 202 (or service application 216) to transmit or initiate a service request 201, with one or more service request parameters 205 that are determined by the event record 102 of the planned service request.

According to some examples, the application feature 235 may include a graphic element 282, one or more activation triggers 284 and a service parameter integration 286. According to examples, the application feature 235 may be activated by activation triggers 284 during a time interval that can be set by configuration parameters 259, as determined by the system 100. For example, the configuration parameters 259 may designate a start time and end time for when the application feature 235 is to be active. When activated, the application feature 235 may convey information about a corresponding event. The application feature 235 may also display information that is indicative of a time when the application feature should be used by the user to make a transport request. In this way, the window of time which the application feature 235 is active (e.g., 15 minutes, 2 hours) may be based on the configuration parameters 259.

The graphic element 282 of the application feature 235 can include image data, such as an iconic image or a dynamic set of images, which indicate or provide information about an event of a scheduled service request. In some examples, the graphic element 282 may convey an action the user should perform to ensure timeliness with regards to the user being able to use the transport service to arrive on time at a corresponding event. In variations, the appearance or visual state of the graphic element 282 may also be based on a remaining duration during which the application feature 235 is to remain active on an interface of the service application 216. For example, the application feature 235 may include text content, or alternatively symbolic or iconic content, corresponding to an indication when transport service should be requested to enable the user to arrive at a particular location or event on time (e.g., time for when user should depart for airport). The appearance of the graphic element 282 may also be dynamic to reflect, for example, a proximity in time to when the user should make the service request (e.g., by selecting the application feature 235).

The service parameter integration 286 may use metadata fields from the event record 102 of the scheduled response trigger to generate the service request 201. The event record 102 may be structured to have a common format, to facilitate integration of event information from various sources (e.g., user online calendar or account) into a structure of the service request 201.

Figure 3:
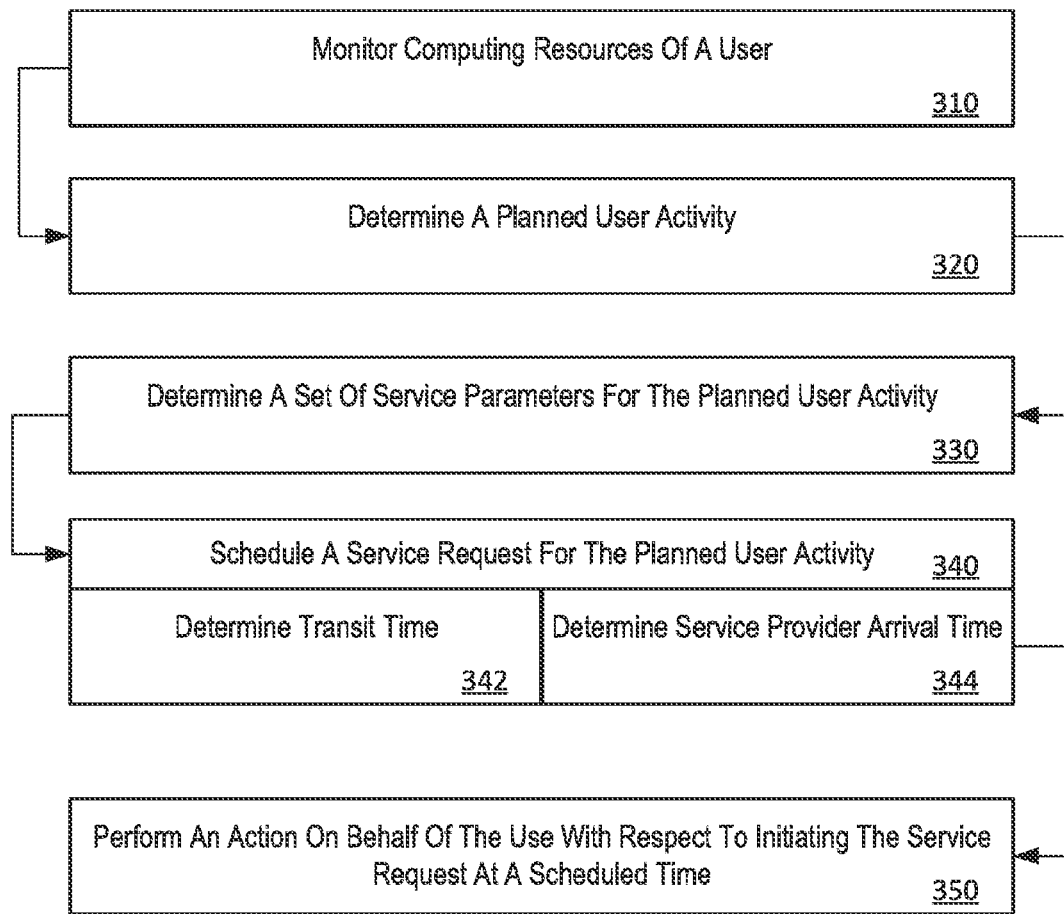
FIG. 3 illustrates an example method for scheduling service requests for planned events and activities of a user.

FIG. 3 illustrates an example method for scheduling service requests for planned events and activities of a user. A method such as described with an example of FIG. 3 may be implemented using one or more components of a system such as described with examples of FIG. 1, FIG. 2A and FIG. 2B. Accordingly, reference may be made to elements of FIG. 1, FIG. 2A and FIG. 2B for purpose of illustrating a suitable component for performing a step or sub-step described therein.

With reference to an example of FIG. 3, the system 100 monitors computing resources of a user to identify indicators for planned events of the user (310). In some examples, the system 100 performs the monitoring by communicating with the user activity monitor 110. The computing resources of the user may include, for example, a mobile device of the user, and/or an online account or set of online accounts for the user. The system 100 may interface with a user's mobile device to access, for example, local data sources residing on the user's mobile device 202. For example, the requester service application 216 running on the mobile device 202 of the user may be instructed to access a calendar application to identify upcoming events which the user may have recently scheduled. As an addition or variation, the system 100 may access information provided with one or more online accounts of the user (e.g., online calendar, social network feed, email store, reservation account, ticket purchase account etc.). Still further, the system 100 may be implemented to accept input regarding upcoming events from users via alternative forms of manual input.

The system 100 may determine a planned user event or activity from monitoring the computing resources of the user (320). In some examples, the planned user event is determined as a transport event. In some examples, the determination of transport events from user activity and event information may be based on implementation of a rules engine. As an addition or variation, the determination of transport events from the user's event and activities information may include profiling user activity using, for example, user activity data 211 generated from the user's mobile device, identification of select types of online activities (e.g., transactions, or transactions from specific sites indicating purchase of event related merchandise (e.g., concert)).

According to some examples, the system 100 determines a set of service parameters for a planned or scheduled user event (330). In one implementation, the system 100 implements programmatic processes to parse information and content from a disparate data set that includes records retrieved from online records and data items generated from the user's activity data (e.g., geographic coordinates and/or sensor data transmitted from the user's mobile device). In one implementation, the event records 102 are generated and structured to include fields that coincide with service request parameters for a transport request (e.g., event location, event start time, type of transport). The system 100 implements processes to parse detected events and activity data for tokens and information items which match to fields of the corresponding event record 102. Once detected, the fields of the event record 102 may be populated with corresponding metadata, determined from the parsed information and detected information items.

In some variations, the system generates event records as part of a process to determine the planned user event or activity. The system 100 may process event records and information to populate the fields of the event record 102, which in turn provide a uniform and readily formatted data structure that enables analysis and subsequent use of identified event information.

In some examples, the system 100 (or service 200) may receive a QR code input (or other form of coded input), initiated by the user operating, for example, a mobile device. In such examples, the QR code may identify a purchased item. The system 100 may analyze the information of the purchased item to determine an event.

The system 100 may schedule a service request for a planned user activity (340). In some examples, the system 100 generates a service request queue 155, corresponding to a set of scheduled service requests which are to be acted on by the system 100. In determining the scheduled service requests, the system 100 may determine a service trip time (342) and a service provider arrival time (344). The determination of the service trip time may be monitored and updated based on, for example, the current location of the user. Additionally, the service trip time may be updated by monitoring environmental conditions, such as traffic congestion at a relevant geographic area of the service request.

The determination of the service provider arrival time may be based on factors such as a determination of the number of service requesters and/or service providers in the relevant geographic area of the service request. In some variations, the determination of the service provider arrival time may also account for a service state of detected service providers (e.g., whether service provider is available, whether service provider is nearing destination and will be available, etc.). In variations, the availability of the service provider may also depend in part on the number of requesters, such as the number of users with open (e.g., unmatched) service requests, and/or the number of users performing an action that is indicative of an imminent service request (e.g., launching the requester service application 216). The determination of the service provider arrival time may also take into account factors which may impede transit time in general, such as traffic.

In some examples, the system 100 may modify the scheduled service request based on determined user activity. For example, the system 100 may monitor the set of computing resources to determine user activity in a time interval preceding the scheduled time of the original service request. The user activity can be monitored by, for example, obtaining location information from the user's mobile device (indicating the user's current location), obtaining sensor information (e.g., movement data to indicate whether the user is moving about), application data from the user's data (e.g., detect an application alert, etc.). The monitored activity can be extended to multiple user devices, such as the user's mobile device 92 and/or smart watch 94. The scheduled service request may be modified by, for example, changing the scheduled service request time and/or service start location, based on a current or predicted user location. Additionally, the monitoring and modifying may be repeated throughout the time interval until the scheduled service request is made.

In some variations, the system 100 obtains (e.g., via the service 200) real-time (or near real-time) information for determining the service time and/or the service provider arrival time. In variations, the system 100 may utilize a modeled determination, based on, for example, historical data that is specific to the geographic location, time of day, day of week and other contextual information.

According to examples, the system 100 performs an action on behalf of the user with respect to initiating the service request at a scheduled time (350). In an example, the action performed by the system 100 is to send a notification to the user about the planned service request. The notification may be transmitted through, for example, the requester service application 216, or through an alternative transport medium. In some examples, the timing (i.e., when the notification is sent) of the notification may be based on the determined service request time for the planned service request. Additionally, the content of the notification may be dynamically determined. For example, the notification may identify a time remaining until when the planned service request is to be initiated.

As another example, the action performed by the system 100 includes configuring one or more selectable application features 235 (e.g., see FIG. 2B) to appear during a time interval that precedes a recommended service request time. The application feature 235 may be associated with service parameters, such that selection of the application feature causes the generation of a service request to transport the user to the event location.

Still further, as another example, the system 100 may automatically make the transport service request at the service request time, using service parameters identified from the corresponding event record 102. The automation of the service request may be based on, for example, a preference or setting of the user.

Figure 4:
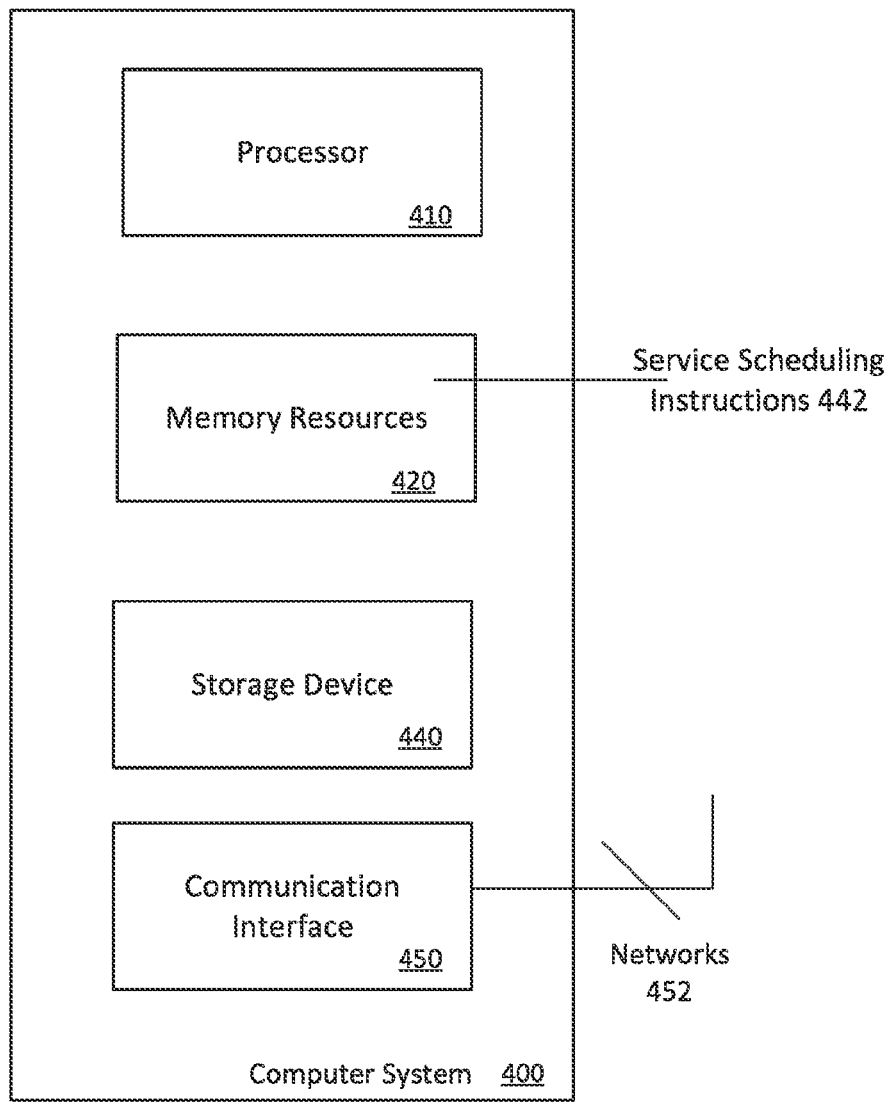
FIG. 4 is a block diagram that illustrates a computer system upon which embodiments described herein may be implemented.

FIG. 4 is a block diagram that illustrates a computer system upon which embodiments described herein may be implemented. A computer system 400 can be implemented on, for example, a server or combination of servers. For example, the computer system 400 may be implemented as part of a network computer system to schedule service requests, as described with an example of FIG. 1. The computer system 400 may be implemented as part of a network service to enable users to schedule service requests, as described with an example of FIG. 2A and FIG. 2B. In the context of FIG. 1, FIG. 2A and FIG. 2B, some or all of the functionality described with the system 100 and/or the service 200 may be implemented using computer system 400. Likewise, a method such as described with an example of FIG. 3 may also be implemented using the computer system 400.

In one implementation, the computer system 400 includes processing resources 410, memory resources 420 (e.g., read-only memory (ROM) or random-access memory (RAM)), a storage device 440, and a communication interface 450. The computer system 400 includes at least one processor 410 to process information (including storing temporary variables) and execute instructions stored in the memory resources 420. The computer system 400 may also include additional storage devices for storing static information and instructions for the processor 410. A storage device 440, such as a magnetic disk or optical disk, is shown for storing information and instructions.

The communication interface 450 enables the computer system 400 to communicate with one or more networks 452 (e.g., cellular network) through use of the network link (wireless or a wire). Using the network link, the computer system 400 can communicate with one or more computing devices, and one or more servers. In accordance with examples, the computer system 400 can execute instructions to enable scheduling of service requests for planned events (shown as "service scheduling instructions 442"). The service scheduling instructions 442 may be stored in the memory 420 and can include, for example, processes for implementing the service scheduling system 100 and variations thereof, as described with an example of FIG. 1, FIG. 2A and FIG. 2B.

Examples described herein are related to the use of the computer system 400 for implementing the techniques described herein. According to an aspect, techniques are performed by the computer system 400 in response to the processor 410 executing one or more sequences of one or more instructions contained in the memory resources 420. Such instructions may be read into the memory resources 420 from another machine-readable medium, such as the storage device 440. Execution of the sequences of instructions contained in the memory resources 420 may cause the processor 410 to perform the process steps described herein.

In alternative implementations, hard-wired circuitry may be used in place of or in combination with software instructions to implement examples described herein. Thus, the examples described are not limited to any specific combination of hardware circuitry and software.

Figure 5:
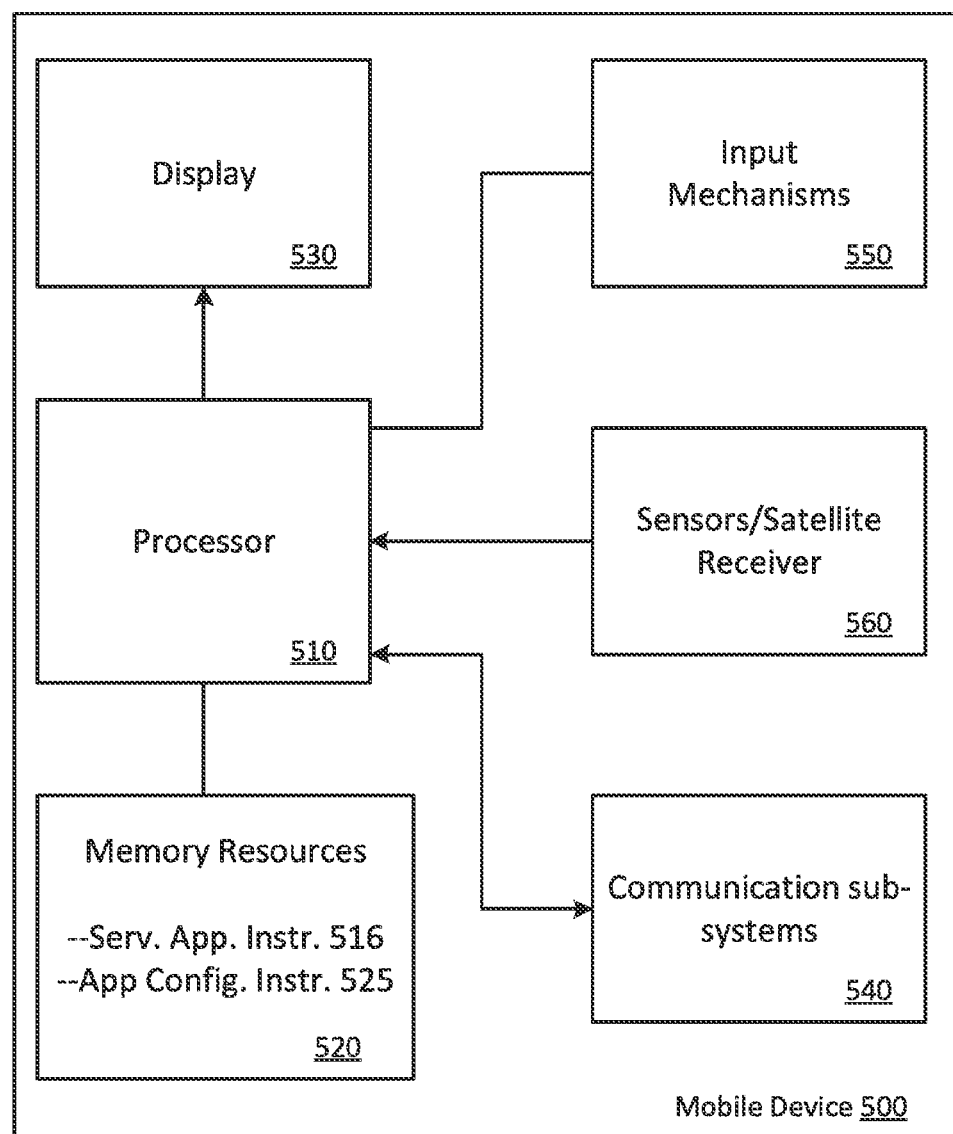
FIG. 5 is a block diagram that illustrates a mobile device upon which examples described herein may be implemented.

FIG. 5 is a block diagram that illustrates a mobile device upon which examples described herein may be implemented. In an example, a mobile device 500 may include a roaming device, capable of wireless communications (e.g., cellular device that is capable of telephony, messaging, and data services). Examples of such devices include smartphones, tablets (and phablets), and other portable or mobile devices capable of cellular or wireless fidelity ("Wi-Fi") communications.

With reference to an example of FIG. 5, a mobile device 500 includes a processor 510, memory resources 520, a display device 530 (e.g., such as a touch-sensitive display device), one or more communication sub-systems 540 (including wireless communication sub-systems), input mechanisms 550 (e.g., an input mechanism can include or be part of the touch-sensitive display device), and one or more sensors (e.g., a satellite receiver component, an accelerometer, one or more cameras, etc.) 560. In one example, at least one of the communication sub-systems 540 sends and receives cellular data over data channels and voice channels.

The processor 510 can provide a variety of content to the display 530 by executing instructions and/or applications that are stored in the memory resources 520. For example, the processor 510 is configured with software and/or other logic to perform one or more processes, steps, and other functions, including to execute (i) service application instructions 516 to implement, for example, service application 216 of FIG. 2A, and (ii) application configuration instructions 525, to configure an appearance or functionality of an application feature 235 or application interface, as described with, for example, FIG. 2A and FIG. 2B. Additionally, application instructions 516 may be used to implement a method such as described with an example of FIG. 2.

Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A computer system comprising:
one or more processors;
a set of memory resources storing a set of instructions that, when executed by the one or more processors, cause the computer system to:
receive, over one or more networks, user data from a computing device of a user;
based on the user data, determine that the user will utilize a transport service to arrive at a destination location at a specified time;
prior to the specified time, monitor transport provider availability within a proximity of a current location of the user;
determine a service request time for the user based at least in part on the transport provider availability; and
automatically generate the service request for the user at the service request time to match the user to a transport provider.

2. The computer system of claim 1, wherein the executed set of instructions cause the computer system to further determine the service request time by determining at least one of (i) a transit time to transport the user to the destination location, or (ii) a transport provider arrival time to transport the user to the destination location.

3. The computer system of claim 1, wherein the executed set of instructions further cause the computer system to:
monitor user activity data of the user prior to the service request time; and
modify the service request based on the user activity data.

4. The computer system of claim 3, wherein the executed set of instructions cause the computer system to modify the service request time by generating an application feature for a service request interface of a service application executing on a computing device of the user, the application feature being selectable by the user to automatically configure and transmit the service request.

5. The computer system of claim 3, wherein the executed set of instructions causes the computer system to modify the service request by:
determining a current location of the user during a time interval preceding the service request time; and
updating the service request time based at least in part on the current location of the user during the time interval preceding the service request time.

6. The computer system of claim 3, wherein the executed set of instructions further cause the computer system to modify the service request by:
monitoring a region of the destination location;
determining, based on monitoring the region, a set of transit factors during a time interval preceding the service request time; and
updating the service request time based at least in part on the set of transit factors.

7. The computer system of claim 6, wherein the executed set of instructions cause the computer system to monitor the region of the destination location by receiving location information from computing devices of a population of transport providers and determining the set of transit factors based at least in part on the location information.

8. The computer system of claim 1, wherein the user data includes a current location of the computing device of the user.

9. The computer system of claim 1, wherein the user data includes sensor data obtained from a motion sensor of the computing device of the user, the sensor data indicating movement of the computing device of the user.

10. The computer system of claim 1, wherein the user data includes a programmatic event generated by a second application running on the computing device of the user.

11. A non-transitory computer readable medium storing instructions that, when executed by one or more processors of a computer system, cause the computer system to:
receive, over one or more networks, user data from a computing device of a user;
based on the user data, determine that the user will utilize a transport service to arrive at a destination location at a specified time;
prior to the specified time, monitor transport provider availability within a proximity of a current location of the user;
determine a service request time for the user based at least in part on the transport provider availability; and
automatically generate the service request for the user at the service request time to match the user to a transport provider.

12. The non-transitory computer readable medium of claim 11, wherein the executed set of instructions cause the computer system to further determine the service request time by determining at least one of (i) a transit time to transport the user to the destination location, or (ii) a transport provider arrival time to transport the user to the destination location.

13. The non-transitory computer readable medium of claim 11, wherein the executed set of instructions further cause the computer system to:
monitor user activity data of the user prior to the service request time; and
modify the service request based on the user activity data.

14. The non-transitory computer readable medium of claim 13, wherein the executed set of instructions cause the computer system to modify the service request time by generating an application feature for a service request interface of a service application executing on a computing device of the user, the application feature being selectable by the user to automatically configure and transmit the service request.

15. The non-transitory computer readable medium of claim 13, wherein the executed set of instructions causes the computer system to modify the service request by:
determining a current location of the user during a time interval preceding the service request time; and
updating the service request time based at least in part on the current location of the user during the time interval preceding the service request time.

16. The non-transitory computer readable medium of claim 13, wherein the executed set of instructions further cause the computer system to modify the service request by:
monitoring a region of the destination location;
determining, based on monitoring the region, a set of transit factors during a time interval preceding the service request time; and
updating the service request time based at least in part on the set of transit factors.

17. The non-transitory computer readable medium of claim 16, wherein the executed set of instructions cause the computer system to monitor the region of the destination location by receiving location information from computing devices of a population of transport providers and determining the set of transit factors based at least in part on the location information.

18. The non-transitory computer readable medium of claim 11, wherein the user data includes a current location of the computing device of the user.

19. The non-transitory computer readable medium of claim 11, wherein the user data includes sensor data obtained from a motion sensor of the computing device of the user, the sensor data indicating movement of the computing device of the user.

20. A computer-implemented method of managing a transport service, the method being performed by one or more processors and comprising:
receiving, over one or more networks, user data from a computing device of a user;
based on the user data, determining that the user will utilize a transport service to arrive at a destination location at a specified time;
prior to the specified time, monitoring transport provider availability within a proximity of a current location of the user;
determining a service request time for the user based at least in part on the transport provider availability; and
automatically generating the service request for the user at the service request time to match the user to a transport provider.

* * * * *